United States Patent
Masuda

(10) Patent No.: US 9,818,202 B2
(45) Date of Patent: Nov. 14, 2017

(54) OBJECT TRACKING BASED ON DISTANCE PREDICTION

(71) Applicant: Sony Corporation, Tokyo (JP)

(72) Inventor: Atsushi Masuda, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/363,194

(22) PCT Filed: Nov. 20, 2012

(86) PCT No.: PCT/JP2012/080033
§ 371 (c)(1),
(2) Date: Jun. 5, 2014

(87) PCT Pub. No.: WO2013/088917
PCT Pub. Date: Jun. 20, 2013

(65) Prior Publication Data
US 2014/0334683 A1    Nov. 13, 2014

(30) Foreign Application Priority Data
Dec. 13, 2011   (JP) ................. 2011-272177

(51) Int. Cl.
*G06T 7/20*   (2017.01)
*G02B 7/34*   (2006.01)
(Continued)

(52) U.S. Cl.
CPC ............. *G06T 7/2033* (2013.01); *G02B 7/34* (2013.01); *G06T 7/246* (2017.01); *G06T 7/254* (2017.01);
(Continued)

(58) Field of Classification Search
CPC ...... G06K 9/00362; G06T 2207/30196; G06T 2207/10004; G06T 2207/10016; G06T 7/20
See application file for complete search history.

(56) References Cited

U.S. PATENT DOCUMENTS

| | | | | |
|---|---|---|---|---|
| 7,561,790 | B2* | 7/2009 | Yata | G02B 7/365 |
| | | | | 348/353 |
| 7,684,590 | B2* | 3/2010 | Kampchen | G06T 7/2046 |
| | | | | 382/103 |

(Continued)

FOREIGN PATENT DOCUMENTS

| | | |
|---|---|---|
| JP | 2009-124313 A | 6/2009 |
| JP | 2010-066494 A | 3/2010 |

(Continued)

OTHER PUBLICATIONS

International Search Report from International Publication PCT/JP2012/080033 dated Feb. 19, 2013.

*Primary Examiner* — Jonathan S Lee
(74) *Attorney, Agent, or Firm* — Chip Law Group

(57) ABSTRACT

Provided is an image processing apparatus including a distance information acquisition unit that acquires distance information on a distance up to an object imaged by an image sensor, a pixel value information acquisition unit that acquires pixel value information of an image corresponding to the object, and a tracking unit that tracks the object that moves, based on the acquired distance information and the acquired pixel value information.

8 Claims, 20 Drawing Sheets

(51) Int. Cl.
  *H04N 5/232* (2006.01)
  *G06T 7/246* (2017.01)
  *G06T 7/254* (2017.01)
  *G03B 13/36* (2006.01)
  *H04N 5/369* (2011.01)

(52) U.S. Cl.
  CPC ..... H04N 5/23212 (2013.01); H04N 5/23219 (2013.01); *G03B 13/36* (2013.01); *G06T 2207/10004* (2013.01); *G06T 2207/10016* (2013.01); *G06T 2207/30241* (2013.01); *H04N 5/3696* (2013.01)

(56) References Cited

U.S. PATENT DOCUMENTS

| | | | | |
|---|---|---|---|---|
| 8,466,977 B2* | 6/2013 | Yoshida | ............... | H04N 5/232 348/222.1 |
| 2002/0150308 A1* | 10/2002 | Nakamura | ......... | G06K 9/00201 382/286 |
| 2009/0009617 A1* | 1/2009 | Ito | ............... | H04N 5/23245 348/222.1 |
| 2010/0045800 A1* | 2/2010 | Chebil | ............... | G03B 13/36 348/169 |
| 2010/0214407 A1* | 8/2010 | Abe | ............... | 348/135 |
| 2011/0006941 A1* | 1/2011 | Samukawa | ........... | G01S 13/345 342/70 |
| 2011/0058097 A1* | 3/2011 | Mizuo | ............... | G03B 13/20 348/350 |
| 2011/0063437 A1* | 3/2011 | Watanabe | ............... | G01S 7/4802 348/140 |
| 2011/0267533 A1* | 11/2011 | Hirose | ............... | H04N 5/23212 348/345 |
| 2011/0298963 A1* | 12/2011 | Kato | ............... | H04N 5/3696 348/345 |
| 2012/0057057 A1 | 3/2012 | Amano | | |
| 2012/0154667 A1* | 6/2012 | Takeuchi | ............... | 348/348 |
| 2012/0218456 A1* | 8/2012 | Sweet, III | ........... | H04N 5/23212 348/345 |
| 2013/0162839 A1* | 6/2013 | Yoneyama et al. | ........... | 348/169 |
| 2015/0022712 A1* | 1/2015 | Koishi | ............... | G02B 7/28 348/352 |
| 2016/0110604 A1* | 4/2016 | Yoneyama | ........ | H04N 5/23212 382/103 |

FOREIGN PATENT DOCUMENTS

| | | | |
|---|---|---|---|
| JP | 2010-113129 A | | 5/2010 |
| JP | 2010-147762 A | | 7/2010 |
| JP | 2010147762 A | * | 7/2010 |
| JP | 2010-271670 A | | 12/2010 |
| WO | WO 2010137444 A1 | * | 12/2010 |

* cited by examiner

OBJECT TRACKING BASED ON DISTANCE PREDICTION

CROSS-REFERENCE TO RELATED APPLICATION

The present application is a national phase entry under 35 U.S.C. §371 of International Application No. PCT/JP2012/080033 filed Nov. 20, 2012, published on Jun. 20, 2013 as WO 2013/088917 A1, which claims priority from Japanese Patent Application No. JP 2011-272177, filed in the Japanese Patent Office on Dec. 13, 2011.

TECHNICAL FIELD

The present disclosure relates to an image processing apparatus, an image processing method, and a recording medium.

BACKGROUND ART

As an image processing apparatus, for example, an imaging apparatus that, when a moving object is imaged, automatically tracks the object is known (see Patent Literature 1).

Patent Literature 1 describes an imaging apparatus that tracks a target image by repeatedly detecting the target image from a plurality of images based on the target color or luminance.

CITATION LIST

Patent Literature

Patent Literature 1: JP 2010-113129A

SUMMARY OF INVENTION

Technical Problem

However, according to the technology in Patent Literature 1, if a plurality of objects that can be tracked has the same color or luminance, there is a possibility of tracking an object other than the desired object. If, for example, two objects move just like crossing and the two objects have the same color or luminance, there is a possibility that the tracking target is switched from one object to the other.

Thus, the present disclosure proposes a tracking method capable of tracking a moving object with high precision.

Solution to Problem

According to the present disclosure, there is provided an image processing apparatus including a distance information acquisition unit that acquires distance information on a distance up to an object imaged by an image sensor, a pixel value information acquisition unit that acquires pixel value information of an image corresponding to the object, and a tracking unit that tracks the object that moves, based on the acquired distance information and the acquired pixel value information.

According to the present disclosure, there is provided an image processing method including acquiring distance information on a distance up to an object imaged by an image sensor, acquiring pixel value information of an image corresponding to the object, and tracking the object that moves, based on the acquired distance information and the acquired pixel value information.

According to the present disclosure, there is provided a recording medium having a program recorded thereon, the program causing a computer to execute acquiring distance information on a distance up to an object imaged by an image sensor, acquiring pixel value information of an image corresponding to the object, and tracking the object that moves, based on the distance information and the pixel value information acquired.

Then, according to the present disclosure, an image of the object that is moving is tracked based on the distance information and the pixel value information acquired. Thus, even if, for example, a plurality of objects has the same pixel value information of the color, luminance or the like, individual objects can be recognized based on the distance information and the desired object can be tracked and therefore, the moving object can be tracked with high precision.

Advantageous Effects of Invention

According to the present disclosure, as described above, a moving object can be tracked with high precision.

DESCRIPTION OF EMBODIMENT

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the order shown below:
1. First Embodiment
1-1. Outside Configuration of Imaging Apparatus
1-2. Electrical Configuration of Imaging Apparatus
1-3. Detailed Configuration of Image Sensor
1-4. Object Tracking Function
1-5. Operation of Imaging Apparatus
1-6. Summary of First Embodiment
2. Second Embodiment
2-1. Outside Configuration of Imaging Apparatus
2-2. Internal Configuration of Imaging Apparatus
2-3. Electrical Configuration of Imaging Apparatus
2-4. Object Tracking Function
3. Third Embodiment 1. First Embodiment (1.1 Outside Configuration of Imaging Apparatus)

Figure 1:
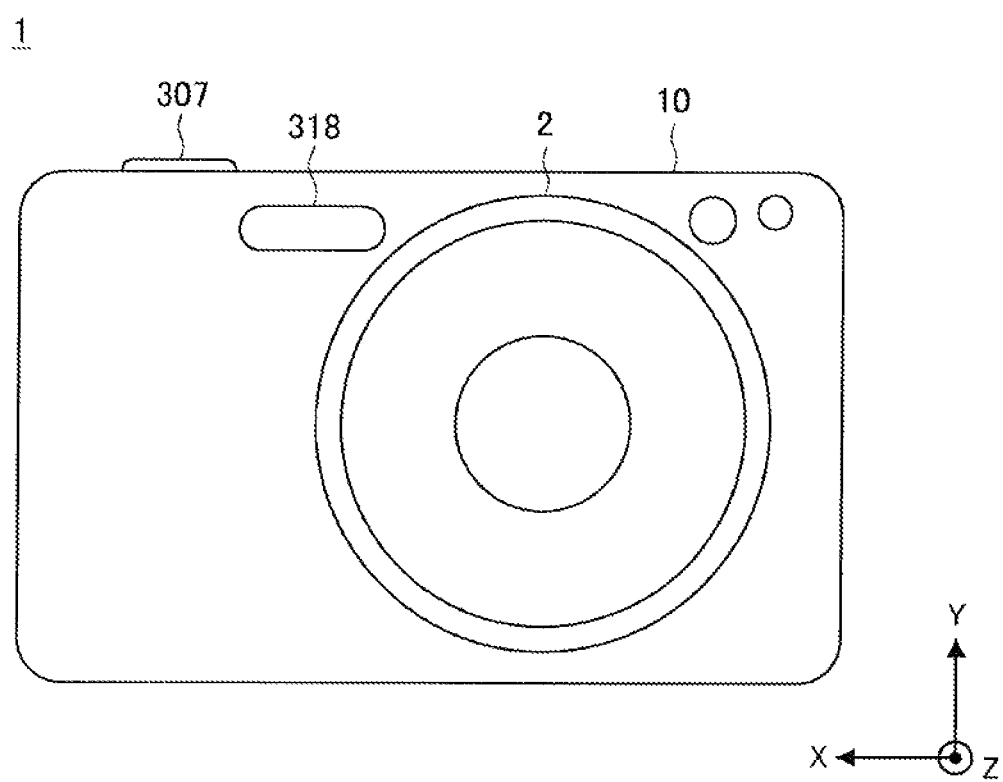
FIG. 1 is a front view showing an outside configuration of an imaging apparatus according to a first embodiment.
Figure 2:
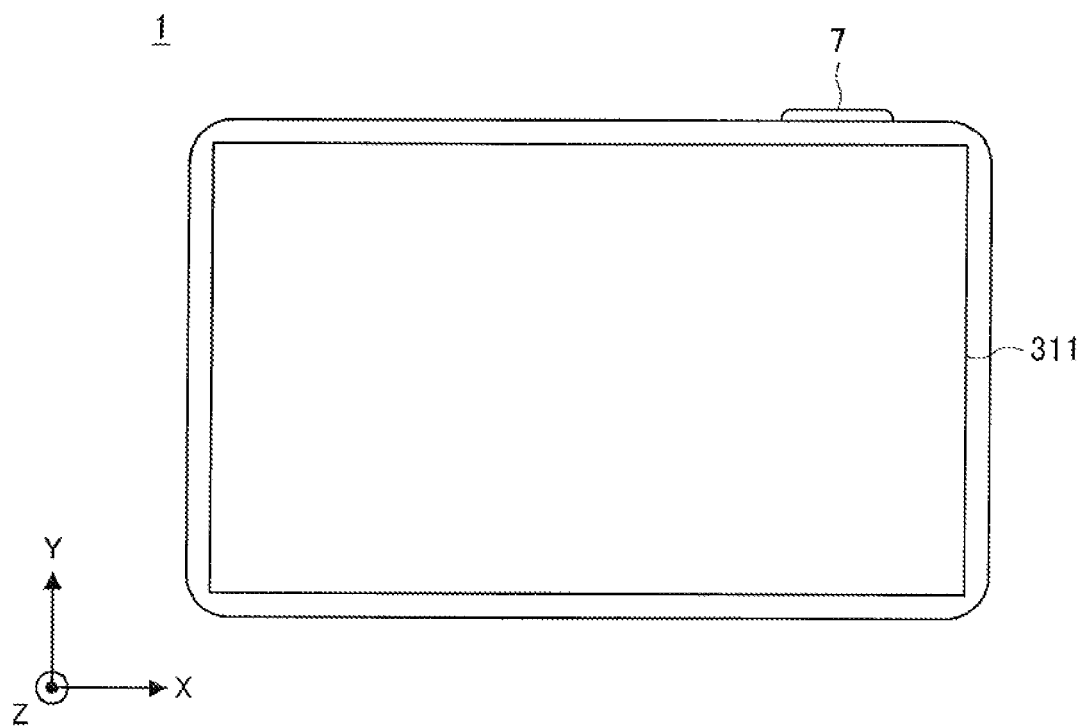
FIG. 2 is a rear view showing the outside configuration of the imaging apparatus according to the first embodiment.

The outside configuration of an imaging apparatus 1 as an example of an image processing apparatus according to the first embodiment will be described with reference to FIGS. 1 and 2. FIG. 1 is a front view showing the outside configuration of the imaging apparatus 1 according to the first embodiment. FIG. 2 is a rear view showing the outside configuration of the imaging apparatus 1 according to the first embodiment.

The imaging apparatus 1 is configured as, for example, a compact digital still camera. The imaging apparatus 1 includes a camera body 10 and an imaging lens 2 fixed to the camera body 10.

In FIG. 1, a built-in flash 318 and a shutter button 307 arranged on the top surface are provided on the front side of the camera body 10. As shown in FIG. 2, an LCD (Liquid Crystal Display) 311 is provided on the rear side of the camera body 10.

The shutter button 307 is a push-down switch capable of performing a "halfway pressed state" operation in which the shutter button is pressed halfway down and a "fully pressed state" operation in which the shutter button is further pressed all the way down. When the shutter button 307 is pressed halfway down in still image capturing mode, a preparatory operation (preparatory operation such as the setting of an exposure control value and focus detection) to capture a still image of an object is performed. On the other hand, when the shutter button 307 is pressed all the way down, an imaging operation (a series of operations including exposing an image sensor 4 shown in FIG. 3, performing predetermined image processing on an image signal obtained by the exposure, and recording the image signal in a memory card or the like) is performed.

The LCD 311 includes a color liquid crystal touch panel capable of displaying images and displays through images as images of an object captured by the image sensor 4 and plays back recorded images. The LCD 311 is also used to set functions or modes implemented in the imaging apparatus 1 and displays setting screens thereof. Instead of the LCD 311, an organic EL or plasma display apparatus capable of touch input may be used.

A main switch (not shown) is arranged on the top surface of the camera body 10 and configured as a push switch to turn on and turn off the imaging apparatus 1 each time the switch is pressed.

The imaging lens 2 functions as a lens window to capture light (light image) from an object and also functions as an imaging optical system to guide the object light to the image sensor 4 arranged inside the camera body 10. The imaging lens 2 includes a lens group containing a plurality of lenses arranged serially along the optical axis. The lens group contains a focus lens to adjust the focus and a zoom lens for variable power and these lenses are each driven along the optical axis direction for variable power or focus adjustments.

(1-2. Electrical Configuration of Imaging Apparatus)

Figure 3:
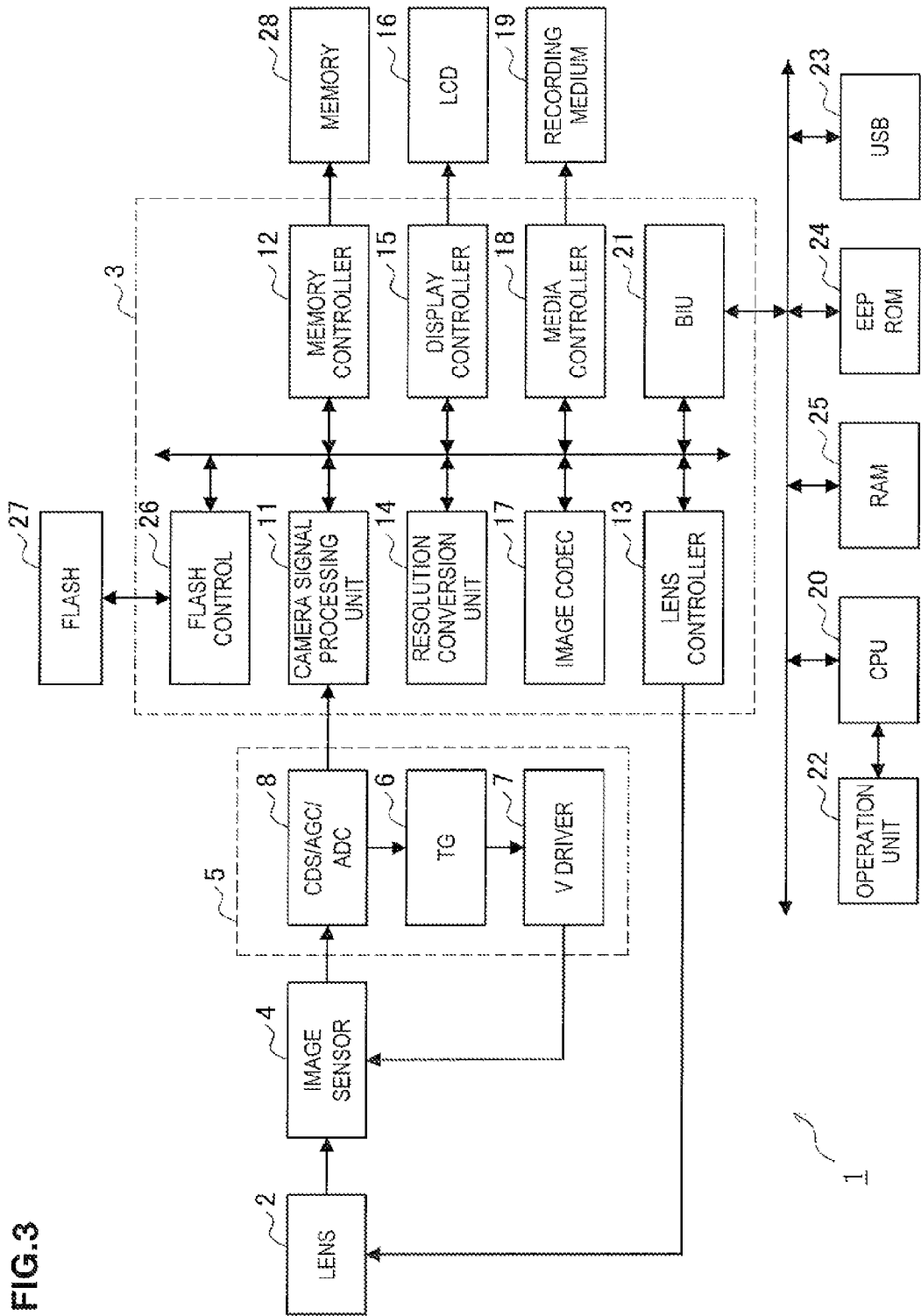
FIG. 3 is a block diagram showing an electrical configuration of the imaging apparatus according to the first embodiment.

The electrical configuration of the imaging apparatus 1 according to the first embodiment will be described with reference to FIG. 3. FIG. 3 is a block diagram showing the electrical configuration of the imaging apparatus 1 according to the first embodiment.

As shown in FIG. 3, the imaging apparatus 1 includes the imaging lens 2, a camera DSP unit 3, the image sensor 4, a preprocessing unit 5, an LCD 16, a recording medium 19, an operation unit 22, a CPU 20, a USB 23, an EEPROM 24, a RAM 25, a flash 27, and a memory 28.

The imaging lens 2 condenses incident light onto an imaging surface of the subsequent image sensor 4 by varying the zoom lens, focusing, and diaphragm under the control of the camera DSP (Digital Signal Processor) unit 3, thereby forming an optical image on the imaging surface of the subsequent image sensor 4.

The image sensor 4 images an object. The image sensor 4 is a CMOS (Complementary Metal-Oxide Semiconductor) solid image sensor or the like and photoelectrically converts the optical image formed on the imaging surface by driving the preprocessing unit 5 to output an imaging signal as an imaging result.

The image sensor 4 is arranged on a plane (XY plane) perpendicular to the Z axis and receives object light. In the image sensor 4, a plurality of pixels configured by including a photodiode is arranged two-dimensionally in a matrix shape. Then, a normal pixel in which color filters of, for example, R (red), G (green), and B (blue) having mutually different spectral characteristics are disposed in the ratio of 1:2:1 and a phase difference pixel to detect the focus by pupil division of object light are arranged on the receiving surface of each pixel.

The image sensor 4 generates and outputs an analog electric signal (image signal) of each color component of R (red), G (green), and B (blue) concerning the object light image formed after the passage through the image lens 2 as an image signal of each color of R, G, and B and also outputs phase difference information. A detailed configuration of the image sensor 4 will be described later.

The preprocessing unit 5 drives the image sensor 4 and also outputs image data by performing signal processing on an imaging signal output from the image sensor 4. The preprocessing unit 5 includes a timing generator (TG) 6, a V driver 7, and a CDS/AGC/ADC unit 8.

The timing generator (TG) 6 generates and outputs various timing signals as driving standards of the image sensor 4 and the V driver 7 drives the image sensor 4 based on timing signals generated by the timing generator 6.

The CDS/AGC/ADC unit 8 subjects an imaging signal output from the image sensor 4 to correlated double sampling (CDS), thereby generating, for example, a color signal of primary colors. Further, after correcting the signal level of a color signal by automatic gain control (AGC), the CDS/AGC/ADC unit 8 generates image data by analog to digital converter (ADC). Then, the CDS/AGC/ADC unit 8 outputs the image data to the camera DSP unit 3.

The camera DSP unit 3 switches the operation under the control of the central processing unit (CPU) 20 and uses the memory 28 to perform processing related to recording, playback, monitoring and the like of image data output from the preprocessing unit 5. The memory 28 forms a work area of the camera DSP unit 3.

The camera DSP unit 3 includes a camera signal processing unit 11, a memory controller 12, a lens controller 13, a resolution conversion unit 14, a display controller 15, an image codec 17, a media controller 18, a BIU 21, and a flash controller 26.

The camera signal processing unit 11 performs white balance adjustment processing, gamma correction processing and the like on image data output from the preprocessing unit 5, stores the processed image data in the memory 28 via the memory controller 12, and outputs the image data to the resolution conversion unit 14. The camera signal processing unit 11 also detects information needed for diaphragm corrections and autofocus adjustments from the image data and outputs the information to the lens controller 13.

The memory controller 12 is a controller to control the memory 28 externally added to the camera DSP unit 3 and records image data output from each unit of the camera DSP unit 3 to the memory 28 and also reads and outputs image data recorded in the memory 28 to each unit of the camera DSP unit 3.

The resolution conversion unit 14 converts the resolution of image data stored in the memory 28 or image data output from the camera signal processing unit 11 and stores the image data in the memory 28. Accordingly, the camera DSP unit 3 converts an imaging result obtained by the image sensor 4 into the resolution delivered to the LCD 16 for the display and also converts an imaging result into the resolution instructed by the user for the recording medium 19. The camera DSP unit 3 cuts out a partial region of an imaging result and performs processing related to resolution conversion, thereby performing processing of electronic zooming or playback zooming The display controller 15 drives the liquid crystal display (LCD) 16 by image data stored in the memory 28, thereby displaying a monitor image of an imaging result or displaying an imaging result recorded in a recording medium.

The image codec 17 compresses image data stored in the memory 28 to output the compressed image data to each unit of the camera DSP unit 3 or conversely decompresses image data stored in the memory 28 to output the decompressed image data to each unit of the camera DSP unit 3. The technique of JPEG (Joint Photographic Coding Experts Group) is applied to a still image to compress or decompress data. On the other hand, data compression technique using a motion vector such as MPEG1 (Motion Picture Experts Group 1), MPEG2, and MPEG4 of ISO/IEC JTC1/SC29WG11 and H. 263 and H. 264/MPEG4-AVC (Advanced Video Coding) of ITU-T is applied to a moving image.

The media controller 18 records image data stored in the memory 28 in the recording medium 19 and also reads image data recorded in the recording medium 19 to output the image data to the memory 28. As the recording medium 19, various recording media such as a so-called memory card by a semiconductor memory, an optical disk like a recordable DVD (Digital Versatile Disk) and a recordable CD (Compact Disc), and a hard disk drive can widely be applied.

The lens controller 13 controls the diaphragm of the lens block 2 based on information obtained from the camera signal processing unit 11 and also controls the auto focus of the lens block 2 by the so-called hill-climbing method. The lens controller 13 also varies the zoom of the lens block 2 in response to the user's operation under the control of the CPU 20.

The BIU (Bus Interface Unit) 21 is the interface between the CPU 20 and the camera DSP unit 3 and commands related to control of the camera DSP unit 3 by the CPU 20 are input and output therethrough.

The flash controller 26 controls the light quantity of the flash 27 to the light quantity set by the CPU 20 in flash imaging mode.

The operation unit 22 is an operation control provided in the imaging apparatus 1 or a user interface by a touch panel provided in the display screen of the LCD 16 and notifies the CPU 20 of an operation by the user.

The USB (Universal Serial Bus) 23 is a storage class compliant interface and connects an external device such as a personal computer to input/output various kinds of data into/from the external device.

The EEPROM (Electrically Erasable Programmable Read-Only Memory) 24 is a recording medium recording a processing program of the CPU 20 and the like. The RAM 25 is the work memory of the CPU 20. In the imaging apparatus 1, the processing program (for example, a program executing the object tracking function) of the CPU 20 can be provided by being installed in the imaging apparatus 1 in advance. Instead of providing the program by preinstallation, the program may also be provided by installation via a network such as the Internet or provided by various kinds of media such as a memory card, optical disk, magnetic disk or the like.

The CPU 20 is a controller controlling the operation of the imaging apparatus 1 and controls the operation of each unit in response to an operation of the operation unit 22 or the like by the user by executing the processing program recorded in the EEPROM 24.

That is, when image capturing is instructed by an operation of the operation unit 22, the CPU 20 acquires an imaging result as moving images from the image sensor 4 by controlling the operation of the preprocessing unit 5 and the camera DSP unit 3 to sequentially process the imaging result and sequentially stores the imaging result in the memory 28 via the camera signal processing unit 11 and the memory controller 12. The CPU 20 also converts the resolution of image data as an imaging result sequentially stored in the memory by the resolution conversion unit 14 and drives the LCD 16 by image data through the display controller 15. Accordingly, while recording an imaging result as moving images in the memory 28, the CPU 20 displays a monitor image of the imaging result in the LCD 16.

If, in this state, recording of the imaging result as still images is instructed by the user, the CPU 20 stops storage of output data of the camera signal processing unit 11 in the memory 28. Then, the CPU 20 converts image data stored in the memory 28 when the acquisition of an imaging result is instructed to the resolution instructed by the user through the resolution conversion unit 14. The CPU 20 also compresses the image data having undergone resolution conversion processing by the image codec 17 and then records the compressed image data in the recording medium 19. In the sequence of processing, the CPU 20 instructs the resolution conversion unit 14 to create thumbnail images and thumbnail images for indexes are thereby created. The CPU 20 also records thumbnail images as index images of an imaging result recorded in the recording medium 19.

Similarly, the start of recording as moving images is instructed by the user is instructed, the CPU 20 stops storage of output data of the camera signal processing unit 11 in the memory 28 and starts resolution conversion processing of image data output from the camera signal processing unit 11 by the resolution conversion unit 14. The CPU 20 also instructs data compression processing by the image codec 17 of the image data processed by the resolution conversion unit 14 and instructs the media controller 18 to record an imaging result by the image codec 17. Also in this processing, the CPU 20 instructs the resolution conversion unit 14 to create a thumbnail image of the first frame when recording is started and records the thumbnail image in the recording medium 19 as an index image of an imaging result recorded in the recording medium 19.

(1-3. Detailed Configuration of Image Sensor)

Figure 4:
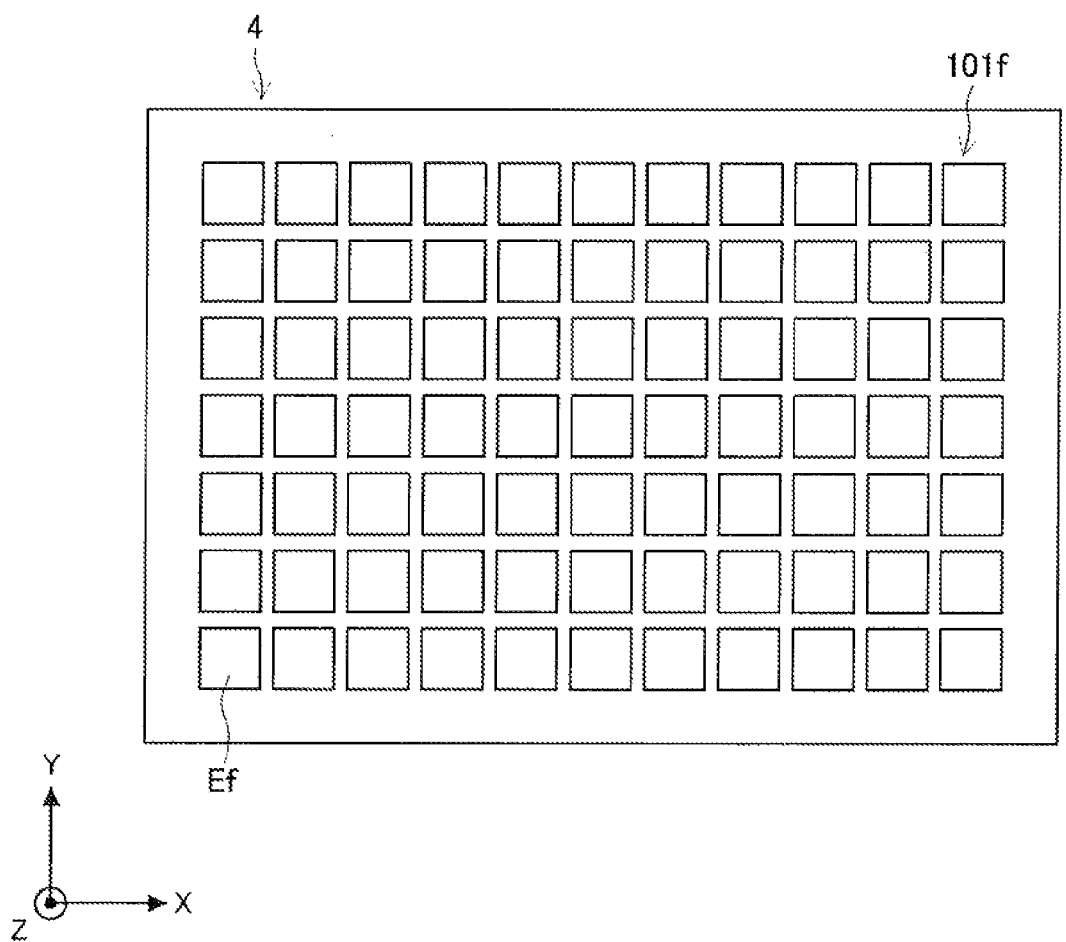
FIG. 4 is a diagram illustrating the configuration of an image sensor.
Figure 5:
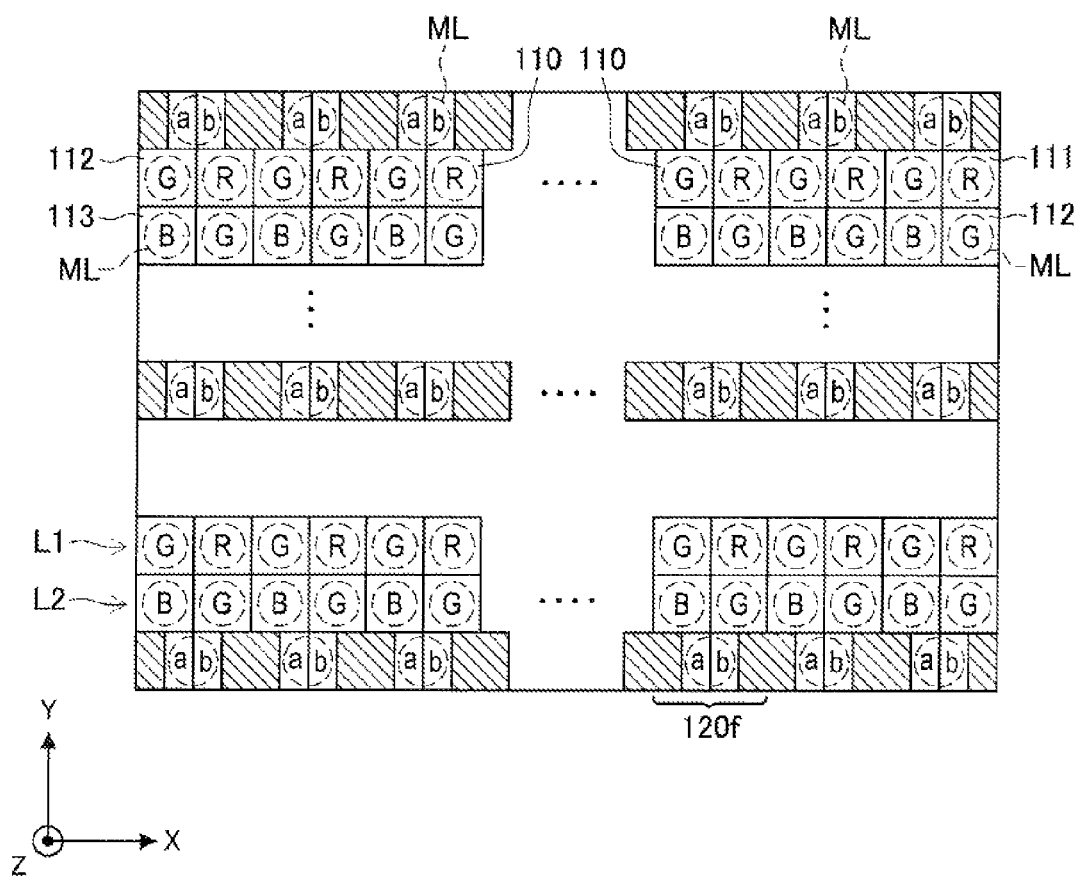
FIG. 5 is a diagram illustrating the configuration of the image sensor.

The configuration of the image sensor 4 will be described with reference to FIGS. 4 and 5. FIGS. 4 and 5 are diagrams illustrating the configuration of the image sensor 4.

As shown in FIG. 4, the image sensor 4 is configured to be able to detect the focus based on the phase difference detection method by each of a plurality of AF areas Ef specified in a matrix shape on an imaging surface 101f.

In each AF area Ef, normal pixels (hereinafter, also called "normal pixels") 110 including an R pixel 111, a G pixel 112, and a B pixel 113 in which each color filter of R (red), G (green), and B (blue) is disposed respectively are provided between micro-lenses ML (ray circle shown in FIG. 5) functioning as condenser lenses and photodiodes. On the other hand, a pair of pixels (hereinafter, also called an "AF pixel pair") 120f to realize the pupil division function to perform a phase difference AF is provided in each AF area Ef. A plurality of AF pixel pairs 120f is a phase difference pixel that adjusts the focus by detecting a phase difference of an object. In the AF area Ef, image information of an object is basically acquired by the normal pixels 110, the number of which is larger than the number of the AF pixel pairs 120f.

In the AF area Ef, a Gr line L1 in which the G pixel 112 and the R pixel 111 are alternately arranged in the horizontal direction and a Gb line L2 in which the B pixel 113 and the G pixel 112 are alternately arranged in the horizontal direction are formed as horizontal lines (hereinafter, also called "normal pixel lines") Ln of the normal pixels 110 not having the pupil division function. The Bayer array by groups of the normal pixels 110 is configured by the Gr line L1 and the Gb line L2 being arranged alternately in the vertical direction.

Also in the AF area Ef, an AF line Lf in which the plurality of AF pixel pairs 120f is arranged side by side is periodically formed in the vertical direction by the AF pixel pairs 120f including one micro-lens ML of the same configuration (the diameter and curvature) as the normal pixel 110 being arranged repeatedly along the horizontal direction. It is preferable to provide as many (for example, four or more) normal pixel lines Ln as needed to interpolate image information of an object lacking in the AF line Lf between the AF lines Lf adjacent to each other in the vertical direction. As a combination of two normal pixel lines Ln adjacent above or below the AF line Lf, horizontal lines of the same type (Gr lines L1 or Gb lines L2) or horizontal lines of different types (one Gr line L1 and one Gb line L2) may be combined.

(1-4. Object Tracking Function)

The imaging apparatus 1 first starts tracking of an object detected by any AF point based on distance information and pixel value information (color information and the like) and continues to bring the closest portion of the object into focus. In addition, an image of the moving object in focus can be captured by tracking focusing while predicting a movement amount of focusing from the current focusing position and the focusing position one frame before of the object.

Figure 6:
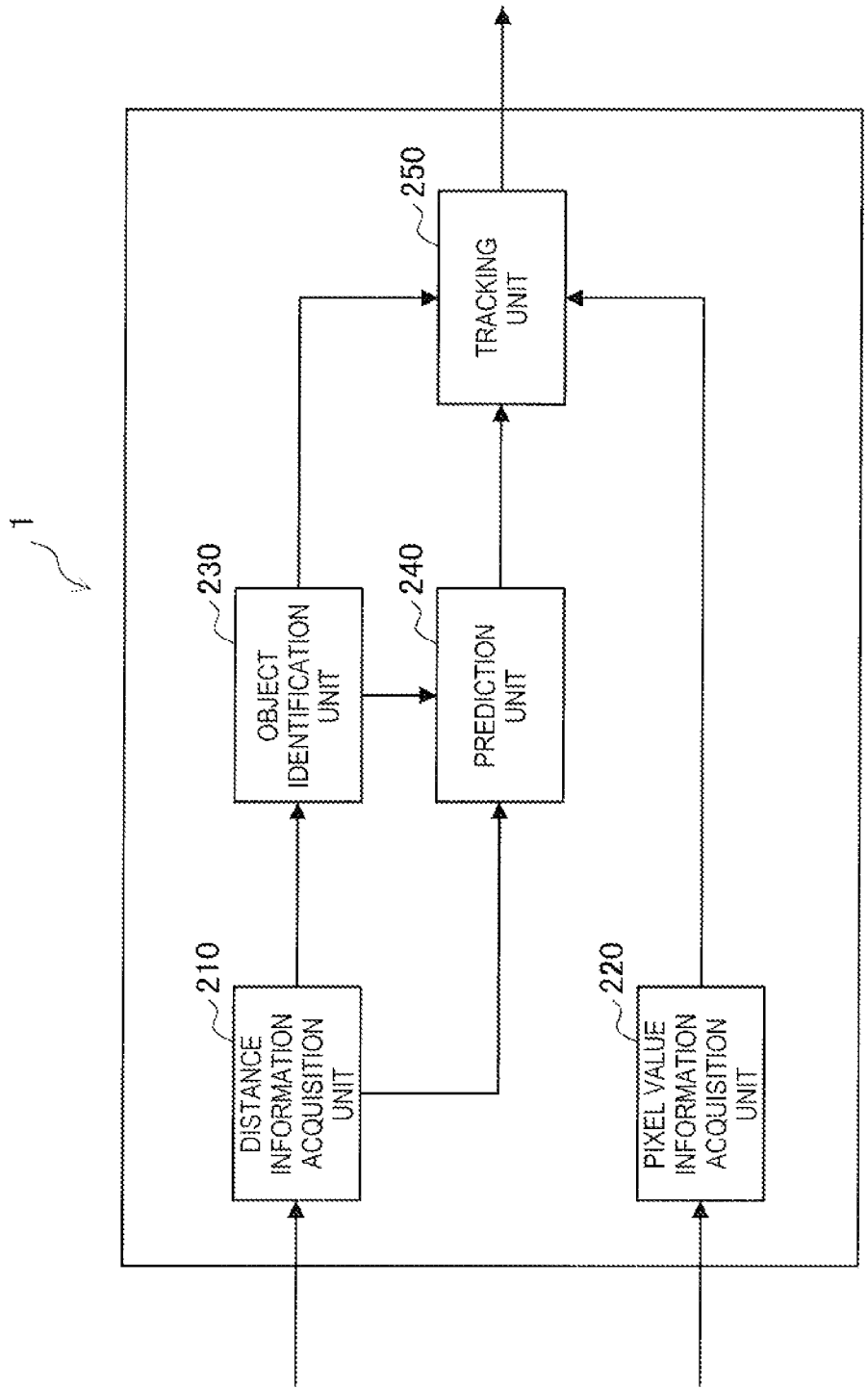
FIG. 6 is a block diagram showing an example of the configuration of a tracking function of the imaging apparatus.

FIG. 6 is a block diagram showing an example of the configuration of the tracking function of the imaging apparatus 1. As shown in FIG. 6, the imaging apparatus 1 includes a distance information acquisition unit 210, a pixel value information acquisition unit 220, an object identification unit 230, a prediction unit 240, and a tracking unit 250. Elements shown in FIG. 6 are realized the camera DSP unit 3, the preprocessing unit 5, the CPU 20 and the like shown in FIG. 3.

The distance information acquisition unit 210 acquires distance information up to an object to be imaged. More specifically, the distance information acquisition unit 210 acquires distance information based on a phase difference detected by the AF pixel pair 120f of the image sensor 4. The distance information acquisition unit 210 also acquires distance information of an object positioned in different locations. That is, the distance information acquisition unit 210 acquires distance information of an object in each frame of continuous frames.

The distance information acquisition unit 210 may acquire distance information by thinning out part of the plurality of AF pixel pairs 120f in accordance with the size of the object. If, for example, the object has a size equal to a predetermined size or more, the distance information acquisition unit 210 thins out part of the plurality of AF pixel pairs 120f. Even if the AF pixel pairs 120f are thinned out in this manner, the accuracy of detection is only slightly affected if the object has a large size. In addition, thinning out the number of the AF pixel pairs 120f to be detected is effective in power saving. The distance information acquisition unit 210 outputs the acquired distance information to the object identification unit 230 and the prediction unit 240.

The pixel value information acquisition unit 220 acquires pixel value information of object pixels corresponding to an object. Here, the pixel value information is, for example, information about the color and luminance of object pixels. The pixel value information acquisition unit 220 acquires pixel value information of object pixels of each frame in continuous frames. The pixel value information acquisition unit 220 outputs the acquired pixel value information to the tracking unit 250.

The object identification unit 230 identifies the object to be tracked based on the acquired distance information. The example, the object identification unit 230 identifies an object whose distance contained in distance information is smaller than a predetermined value. When compared with the background, the distance from the imaging apparatus 1 to objects like persons is short and a moving person can appropriately be identified by setting an object whose distance is smaller than a predetermined value as an object to be tracked. The object identification unit 230 outputs the identification result to the prediction unit 240.

The prediction unit 240 predicts distance information of the object to be tracked in the location of the destination based on a plurality of pieces of acquired distance information. For example, the prediction unit 240 uses distance information of the object positioned in a plurality of frames immediately before to predict distance information in the location of the destination. The prediction unit 240 outputs the prediction result to the tracking unit 250.

The tracking unit 250 tracks the moving object based on the acquired distance information and pixel value information. Here, the tracking unit 250 tracks the object identified by the object identification unit 230. Accordingly, even if a plurality of objects has, for example, the same pixel value information of the color, luminance or the like, individual objects can be recognized based on the distance information and the desired object can be tracked and therefore, the moving object can be tracked with high precision.

The tracking unit 250 tracks the object if the pixel value information of the object in the location of the destination is the same as the pixel value information of the object in the location immediately before. In other words, if the pixel value information of the object in the location of the destination is different from the pixel value information of the object in the location immediately before, the tracking unit 250 stops tracking. Accordingly, tracking of objects having different pixel value information can be prevented and therefore, the object can be tracked with higher precision.

(1-5. Operation of Imaging Apparatus)

Figure 7:
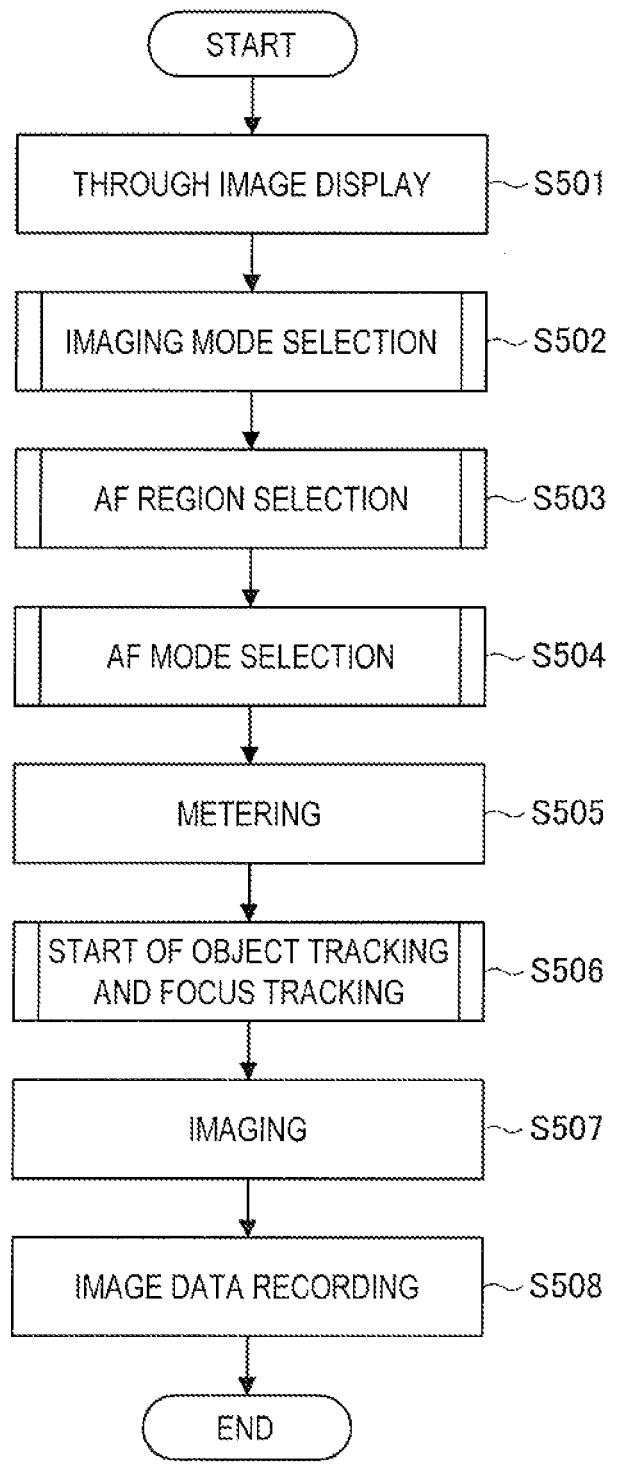
FIG. 7 is a flow chart showing an operation example of the imaging apparatus when an image is captured while a moving object being tracked.

An operation example of the imaging apparatus 1 when an image is captured while a moving object being tracked will be described with reference to FIG. 7. FIG. 7 is a flow chart showing an operation example of the imaging apparatus 1 when an image is captured while a moving object being tracked.

The flow chart in FIG. 7 starts by an imaging apparatus being activated by the user. In step 501, a through image captured by the image sensor 4 is displayed in the LCD 311. The user confirms the object and composition by viewing the displayed through image.

Next, in step 502, the imaging mode selected by the user is received.

Here, the imaging apparatus 1 has a plurality of imaging modes and has, for example, the auto mode and the program mode. The auto mode is a mode in which the shutter speed, F number, ISO sensitivity, firing of a flash, and AF point are selected based on photometric values. The program mode is a mode including a shutter priority AE mode in which the exposure is decided based on the shutter speed arbitrarily selected by the user through the operation unit and an aperture priority AE mode in which the aperture is similarly selected. The user selects an appropriate imaging mode from among these modes by adjusting to imaging conditions. In auto mode, firing of a flash occurs automatically based on a result of metering described later. In other imaging modes than the auto mode, the user selects forced firing or non-firing. These selections can be made through an operation member such as a mode setting dial or the like.

(Selection Processing of the Imaging Mode)

Figure 8:
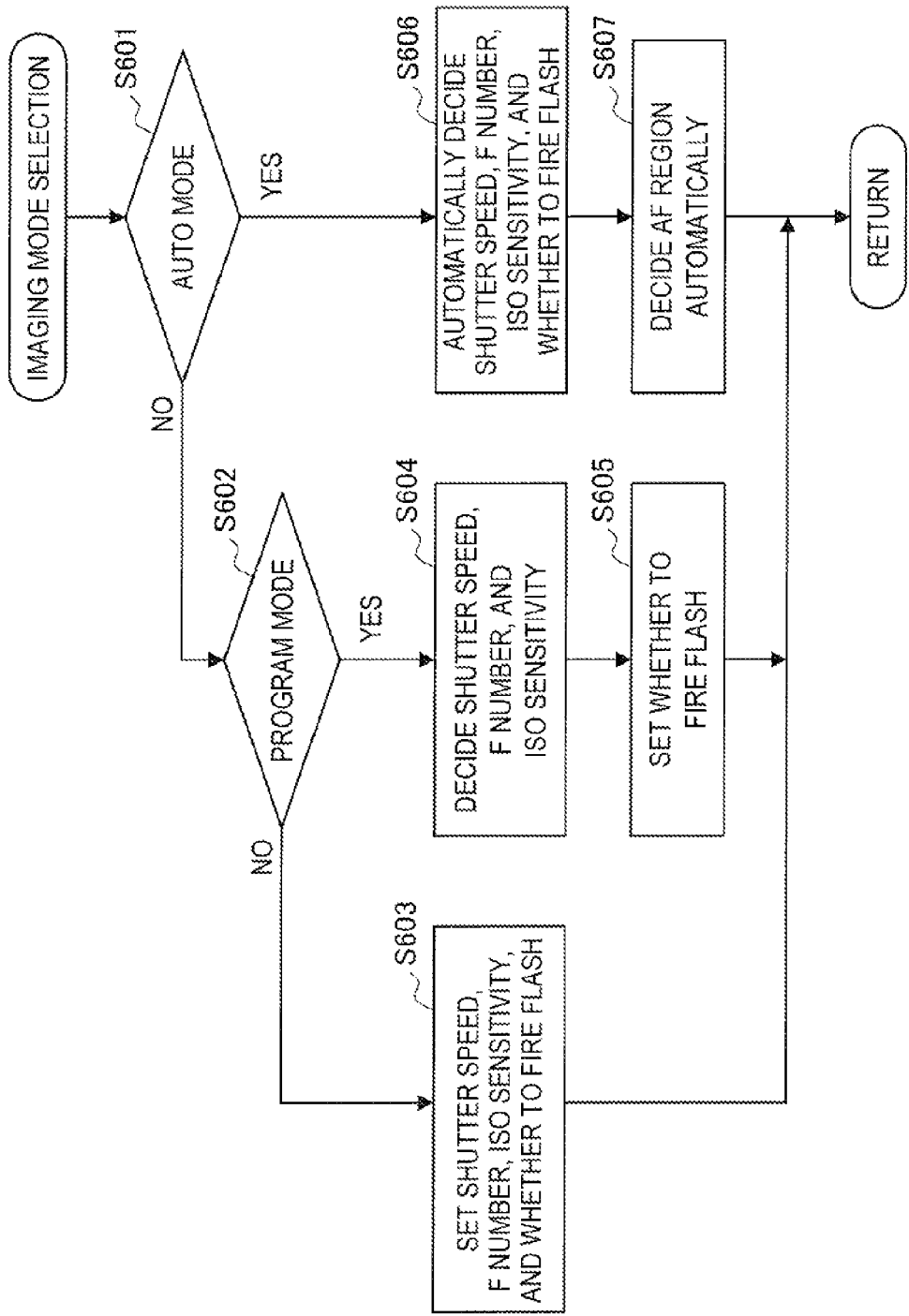
FIG. 8 is a flow chart showing selection processing of an imaging mode.

Selection processing of the imaging mode performed in step 502 will be described with reference to FIG. 8. FIG. 8 is a flow chart showing selection processing of the imaging mode.

In step 601, if the imaging mode is not the auto mode (No), the processing proceeds to step 602. On the other hand, if the imaging mode is the auto mode (Yes), the processing proceeds to step 606. Next, in step 602, if the imaging mode is not the program mode (No), the processing proceeds to step 603. On the other hand, if the imaging mode is the program mode (Yes), the processing proceeds to step 604.

In step 603, the user arbitrarily selects the shutter speed, F number, ISO sensitivity, and firing of a flash based on photometric values metered immediately before.

In step 604, the user decides on one or a plurality of settings from the shutter speed, F number, and ISO sensitivity and other settings are automatically decided based on photometric values metered immediately before. Then, in step 605, the user sets whether to fire a flash.

In step 606, the imaging apparatus 1 automatically sets the shutter speed, F number, ISO sensitivity, and firing of a flash based on photometric values metered immediately before. Then, in step 607, the AF point is automatically selected by fitting to the composition decided by the user.

This completes the selection processing of the imaging mode in step S502 before returning to the flow chart in FIG. 7. In step 503, an AF region selected by fitting to the composition to be imaged by the user and intended for AF is received.

Here, the wide AF, center fixed AF, and local AF are available as the AF region. In the wide AF, the imaging apparatus 1 automatically selects AF points determined to be optimum from all AF points. In the center fixed AF, the AF point present in the center is fixed. In the local AF, the AF points are set to any location from selectable AF points. Then, the user selects the AF region by fitting to circumstances of the object and composition. When the auto mode is selected as the imaging mode, the AF region becomes the wide AF. Object tracking and focus tracking function in the local AF.

(AF Region Selection Processing)

Figure 9:
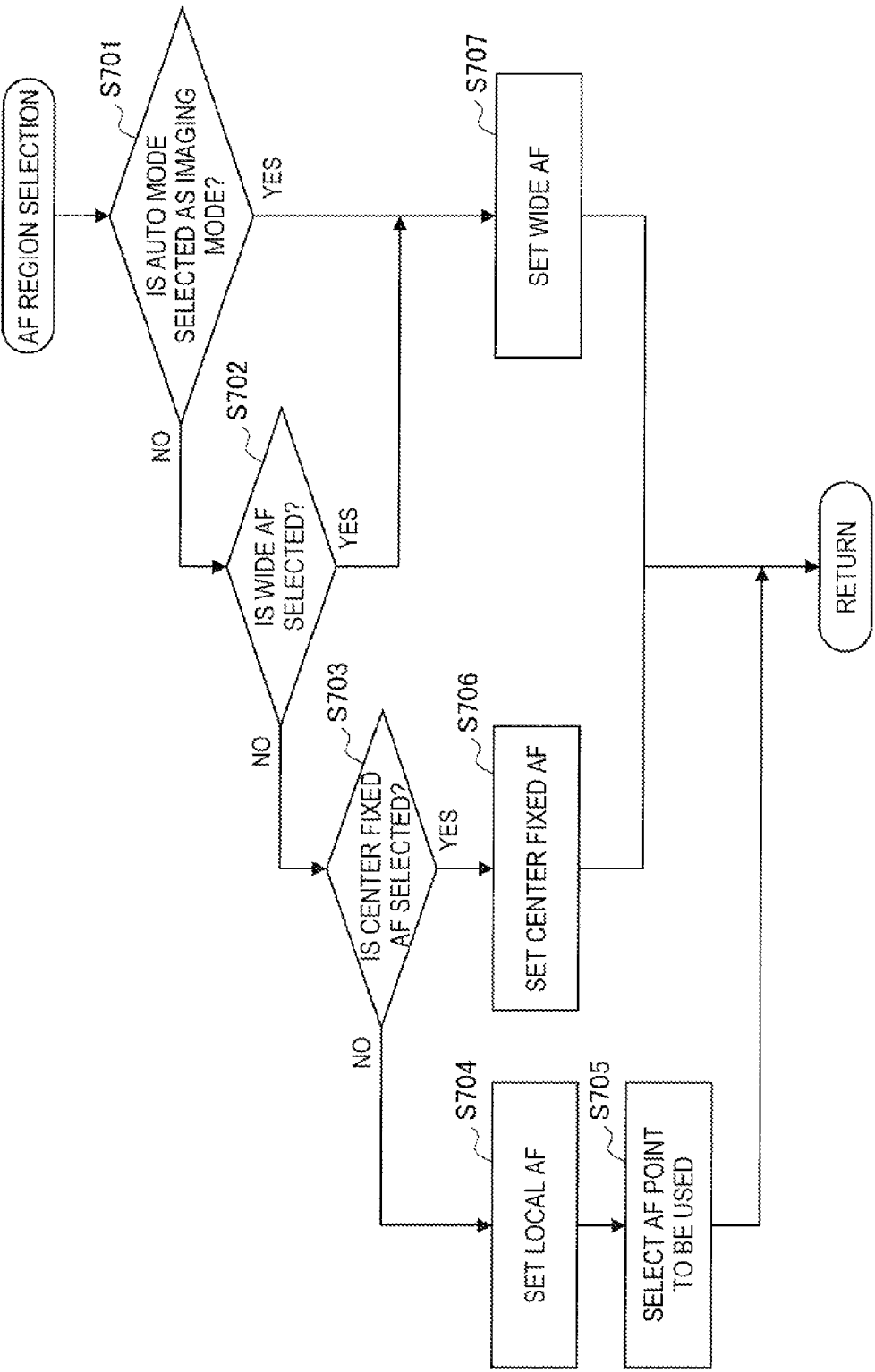
FIG. 9 is a flow chart showing AF selection processing.

AF region selection processing performed in step S503 will be described with reference to FIG. 9. FIG. 9 is a flow chart showing AF region selection processing.

In step 701, if the auto mode is selected as the imaging mode (Yes), the processing proceeds to step 707. On the other hand, if a mode other than the auto mode is selected as the imaging mode (No), the processing proceeds to step 702.

In step 702, if the user selects the wide AF (Yes), the processing proceeds to step 707. On the other hand, if an AF region other than the wide AF is selected (No), the processing proceeds to step 703. In step 703, if the user selects the center fixed AF (Yes), the processing proceeds to step 706. On the other hand, if the local AF is selected (No), the processing proceeds to step 704.

In step 704, the local AF is set as the AF region. Then, in step 705, any one point is selected from all AF points by the user.

In step 706, the center fixed AF is set as the AF region. In this case, AF points present in the center are used for focusing detection. In step 707, the wide AF is set as the AF region. In this case, the imaging apparatus 1 automatically selects the AF point determined to be optimum from all AF points.

This completes the AF region selection processing in step S503 before returning to the flow chart in FIG. 7. In step 504, the AF mode selected by the user fitting to circumstances of the object is received.

The single AF, continuous AF, and auto AF are available as the AF mode. In the single AF, the focusing adjustment state is fixed in the AF point when the shutter button 307 (FIG. 1) is pressed halfway down. In the continuous AF, focusing of the AF point always continues to be adjusted while the shutter button 307 is pressed halfway down. In the auto AF, the imaging apparatus 1 switches the single AF and the continuous AF by fitting to the motion of an object. Object tracking and focus tracking function in the continuous AF.

(AF Mode Selection Processing)

Figure 10:
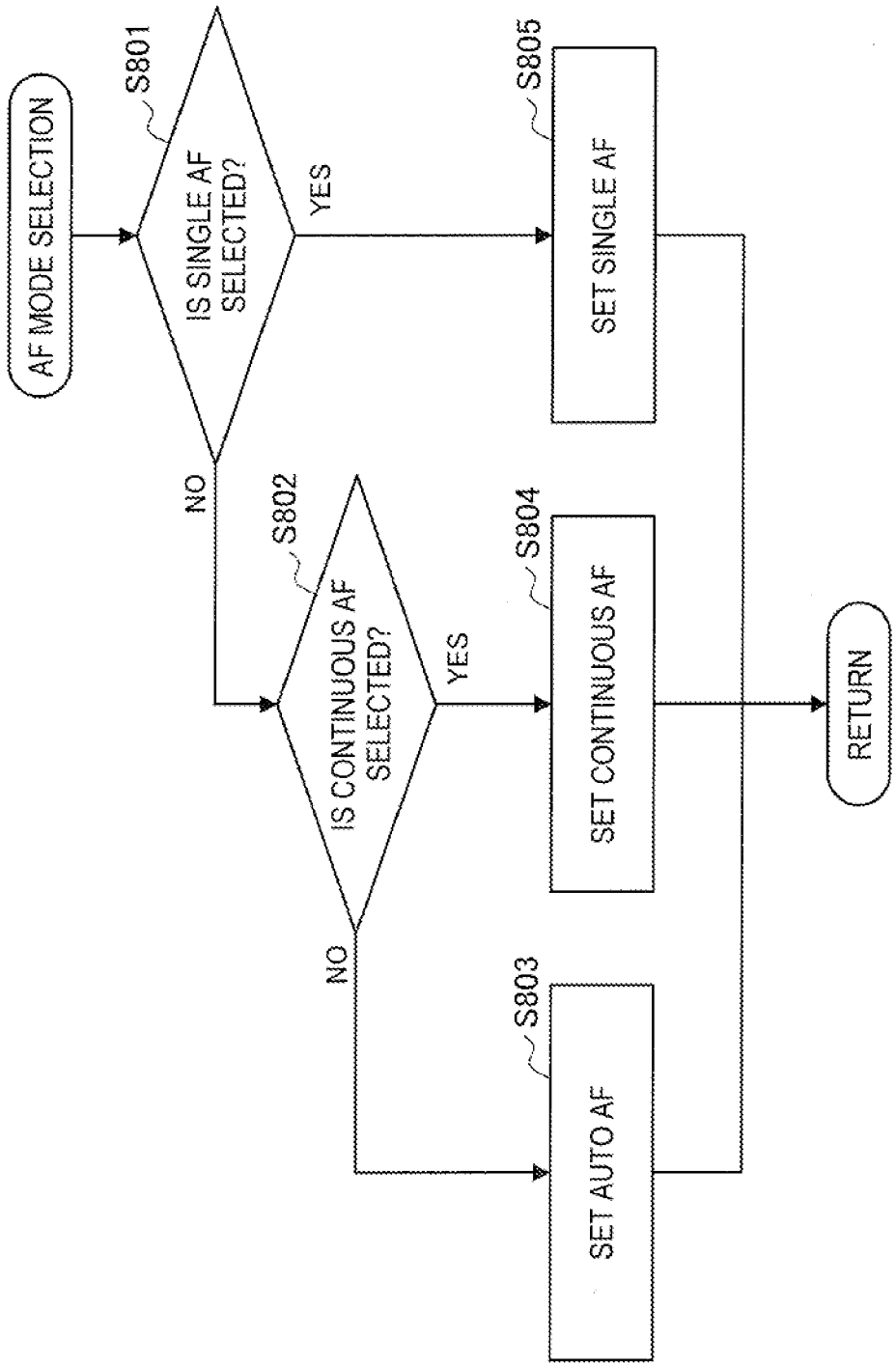
FIG. 10 is a flow chart showing selection processing of an AF mode.

AF mode selection processing performed in step S504 will be described with reference to FIG. 10. FIG. 10 is a flow chart showing selection processing of the AF mode.

In step 801, if the user selects the single AF as the AF mode (Yes), the processing proceeds to step 805. On the other hand, AF other than the single AF is selected as the AF mode (No), the processing proceeds to step 802.

In step 802, if the user selects the continuous AF as the AF mode (Yes), the processing proceeds to step 804. On the other hand, AF other than the continuous AF is selected as the AF mode (No), the processing proceeds to step 803.

In step 803, the auto AF is set as the AF mode. In step 804, the continuous AF is set as the AF mode. In step 805, the single AF is set as the AF mode.

This completes the selection processing of the AF mode in step S504 before returning to the flow chart in FIG. 7. In step 505, the object is metered by the image sensor 4 (FIG. 3). Settings of the shutter speed, F number, ISO sensitivity, and firing of a flash are decided depending on the set imaging mode. Next, in step 506, object tracking and focus tracking are performed.

(Object Tracking and Focus Tracking)

Figure 11:
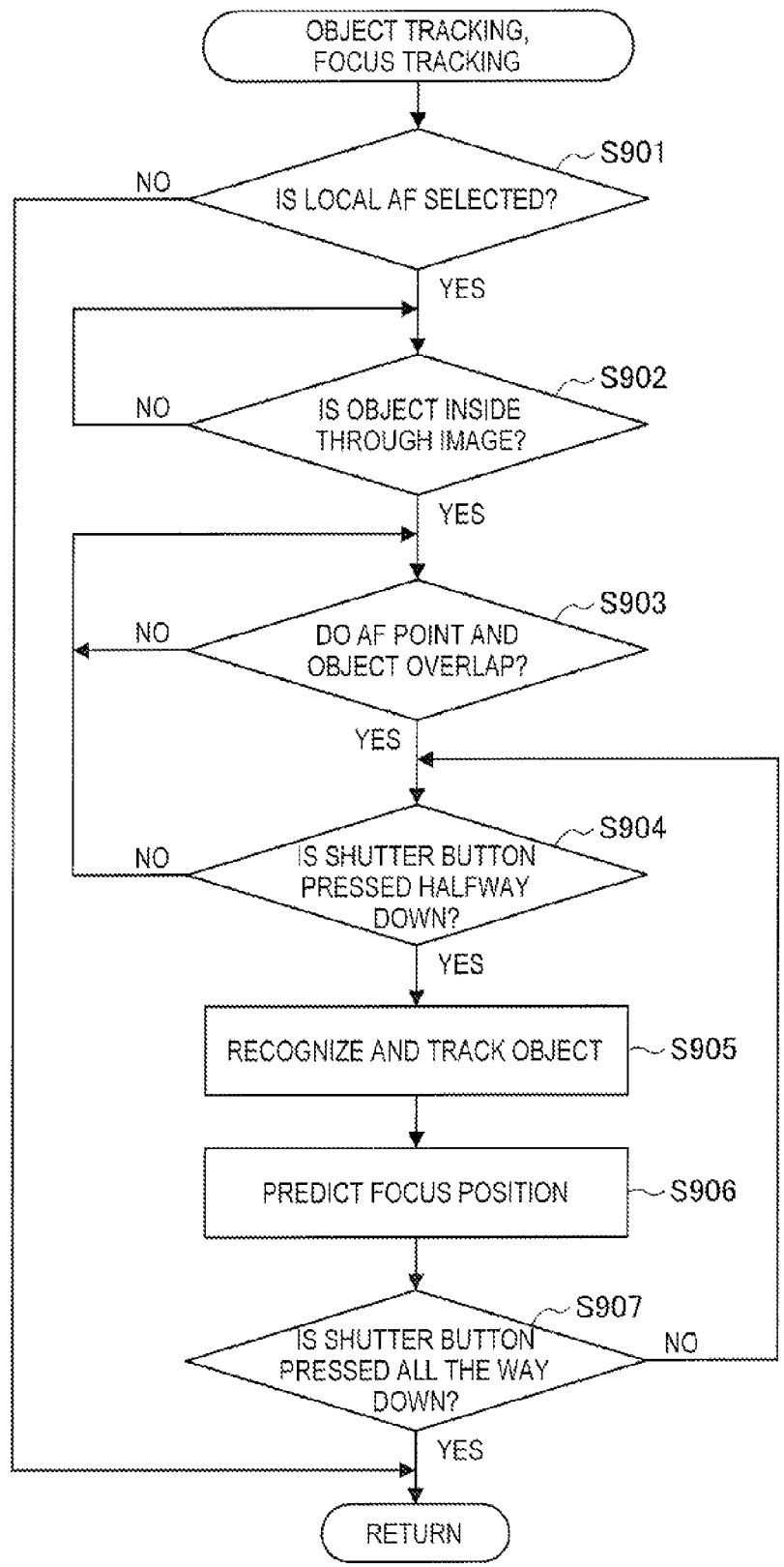
FIG. 11 is a flow chart showing object tracking and focus tracking processing.

Object tracking and focus tracking processing in step S506 will be described with reference to FIG. 11. FIG. 11 is a flow chart showing object tracking and focus tracking processing.

In step 901, if the local AF is selected as the AF region (Yes), the processing proceeds to step 902. On the other hand, if other than the local AF is selected as the AF region (No), the object tracking and focus tracking processing is not performed and the processing proceeds to step 507 in FIG. 7.

In step 902, if the object to be auto-focused is in a through image (Yes), the processing proceeds to step 903. On the other hand, if the object to be auto-focused is not in a through image (No), the determination in step 902 is repeated until the object enters the through image.

In step 903, if the AF point overlaps with the object (Yes), the processing proceeds to step 904. On the other hand, if the AF point does not overlap with the object (No), the determination in step S903 is repeated until the AF point overlaps with the object In step 904, if the shutter button 307 is pressed halfway down (Yes), the processing proceeds to step 905. On the other hand, if the shutter button 307 is not pressed halfway down (No), the processing proceeds to step 903.

In step 905, the object identification unit 230 recognizes the object based on distance information (distance information acquired by the distance information acquisition unit 210) of the AF point and the tracking unit 250 sets a point of the recognized object closest to the imaging apparatus 1 as the point to be focus-tracked.

Figure 12:
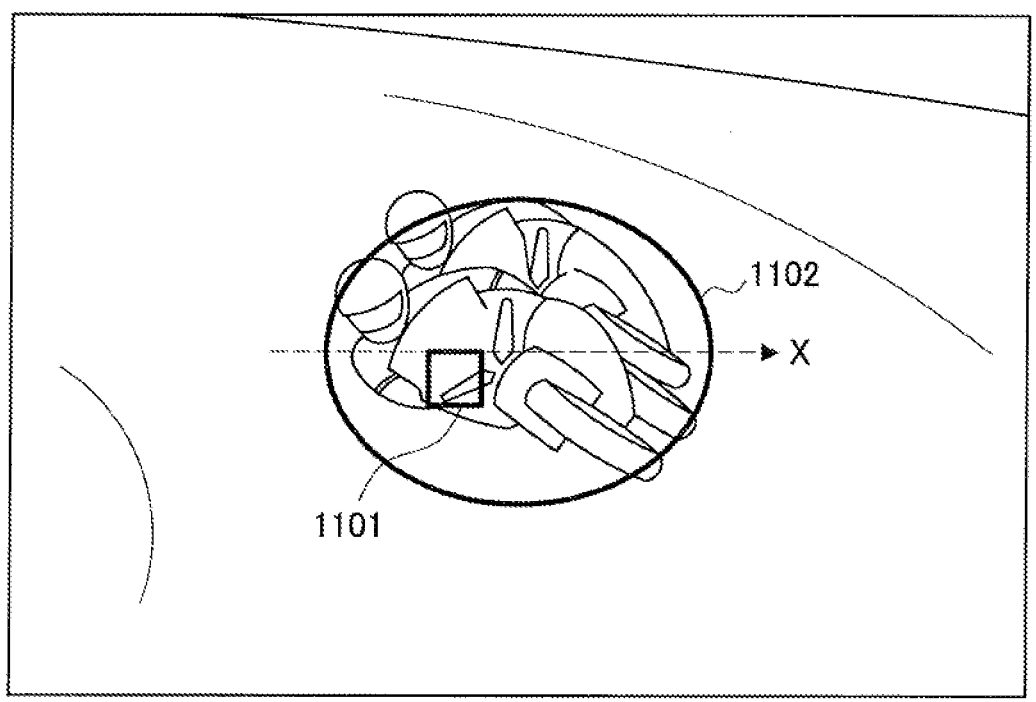
FIG. 12 is a diagram showing the object to be tracked.
Figure 13:
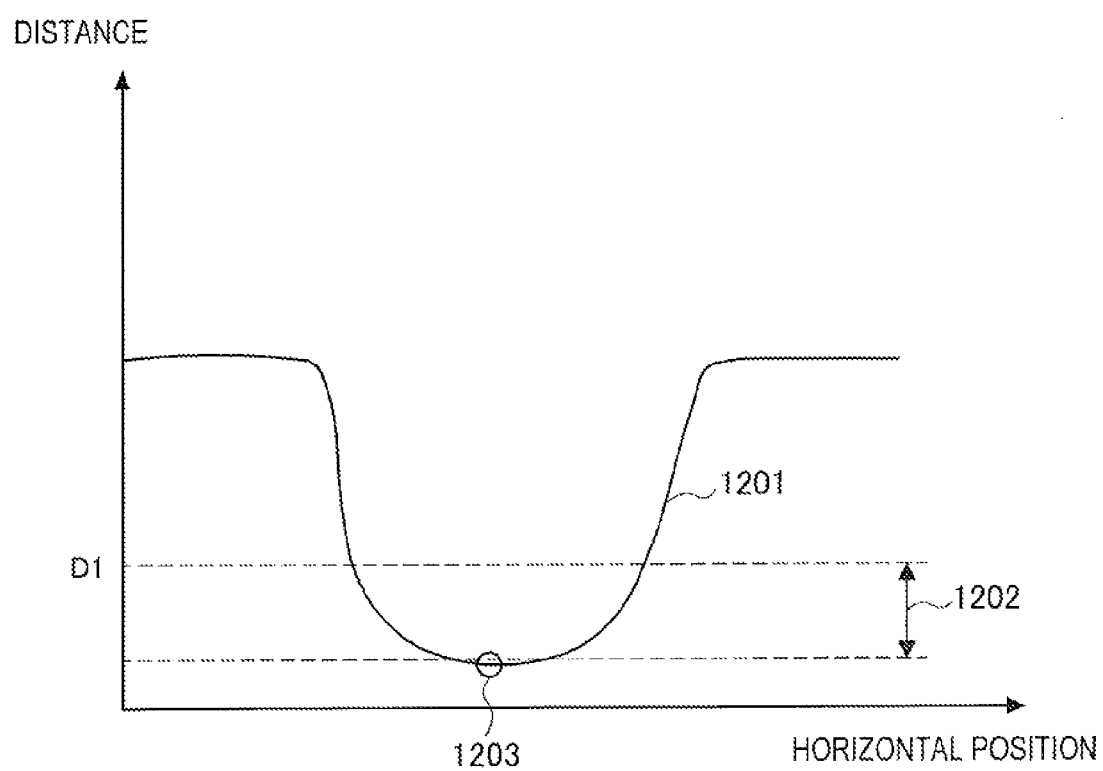
FIG. 13 is a graph showing a relationship between an AF point position and a distance of the object from the imaging apparatus.

Object tracking and the setting of the point to be focus-tracked will be described with reference to FIGS. 12 and 13. FIG. 12 is a diagram showing the object to be tracked. FIG. 13 is a graph showing the relationship between an AF point position and the distance of the object from the imaging apparatus 1.

The distance information detected by AF points present along a broken line arrow X in FIG. 12 has a distribution like 1201 in FIG. 13. The horizontal axis in FIG. 13 represents the AF point position in the horizontal direction corresponding to the broken line arrow X and the vertical line represents the distance from the imaging apparatus 1.

Here, a collection of AF points having the distance information in a range 1202 (predetermined distance D1 or less) is recognized as an object. The range 1202 is assumed to be variable depending on the shape of the object. A point 1203 is the closest point to the imaging apparatus 1 and the distance information corresponding to the point 1203 and color information obtained from normal pixels of the image sensor 4 are combined to set as a point to be focus-tracked. In addition, luminance information obtained from normal pixels or pattern matching contrasted with a reference image may be used as a combination with the distance information.

If the number of AF points recognized as an object exceeds, for example, 50% of all AF points (the object is large), an image sensor 101 may be read by thinning out some lines of AF pixels. This is because the operation of distance information is practically not affected even if the number of AF points is reduced and by reading the image sensor 101 by thinning out some lines of AF pixels, distance information can be operated correctly even when the object moves at high speed.

The description will continue by returning to the flow chart shown in FIG. 11. In step 906, the prediction unit 240 predicts the direction in which the point to be focus-tracked set in step 905 moves, that is, the direction in which the object moves.

Figure 14:
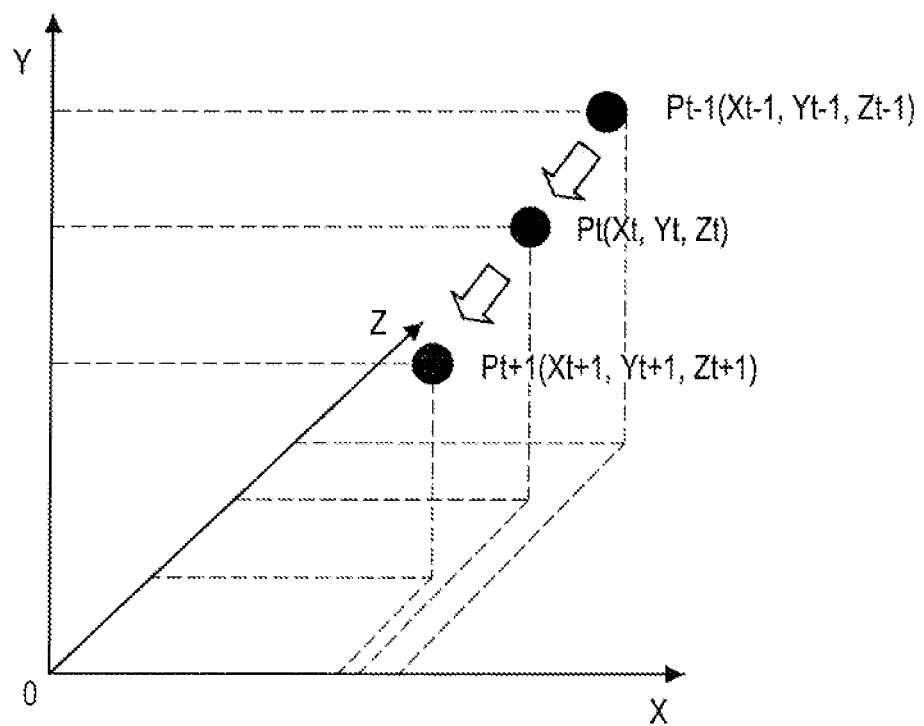
FIG. 14 is a diagram illustrating a prediction method of a direction in which the object moves.

The prediction method of the direction in which the object moves will be described with reference to FIG. 14. FIG. 14 is a diagram illustrating the prediction method of the direction in which the object moves.

Here, it is assumed that the position of the object when the shutter button is pressed halfway down in step 905 is position Pt. Then, the position one frame before is position Pt−1 and the position one frame after is position Pt+1. Position Pt+1 to be predicted can be determined by the following formulas (1) to (3) if represented as Xt+1, Yt+1, Zt+1 by using three-dimensional coordinates:

$$Xt+1=Xt+(Xt-Xt-1) \quad (1)$$

$$Yt+1=Yt+(Yt-Yt-1) \quad (2)$$

$$Zt+1=Zt+(Zt-Zt-1) \quad (3)$$

The direction in which the object moves is predicted by operating the above formulas (1) to (3) as needed to continue to track focus. The X and Y directions correspond to the plane of the image sensor 4 and the value in the Z direction is equivalent to the distance R to the object and AF is performed based on the value. Whether pixel value information of the object at the destination point is the same as that of the object at the point immediately before may be determined during prediction to continue tracking only if the two pieces of pixel value information are the same.

If the shutter button is kept being pressed halfway down (No), steps 904 to 906 are repeated. On the other hand, if the shutter button is pressed all the way down in step 907 (Yes), the processing proceeds to step 507. This completes the object tracking and focus tracking processing in step S506 to return to the flow chart in FIG. 7.

In step 507, a still image is actually captured. Next, in step 508, the result of imaging in step 507 is recorded in a memory card to terminate a series of operations.

(1-6. Summary of First Embodiment)

The imaging apparatus 1 as the above image processing apparatus acquires distance information up to an object imaged by the image sensor 4, acquires pixel value information about the object, and tracks an image of the moving object based on the acquired distance information and pixel value information. Accordingly, even if the object is deformed or accompanied by a complex movement, an image in focus can be captured while the object being tracked on full screen with high precision. Further, even if the object is positioned near the imaging apparatus 1, focusing can be detected at high speed by high-speed driving of the image sensor 4.

2. Second Embodiment (2-1. Outside Configuration of Imaging Apparatus)

Figure 15:
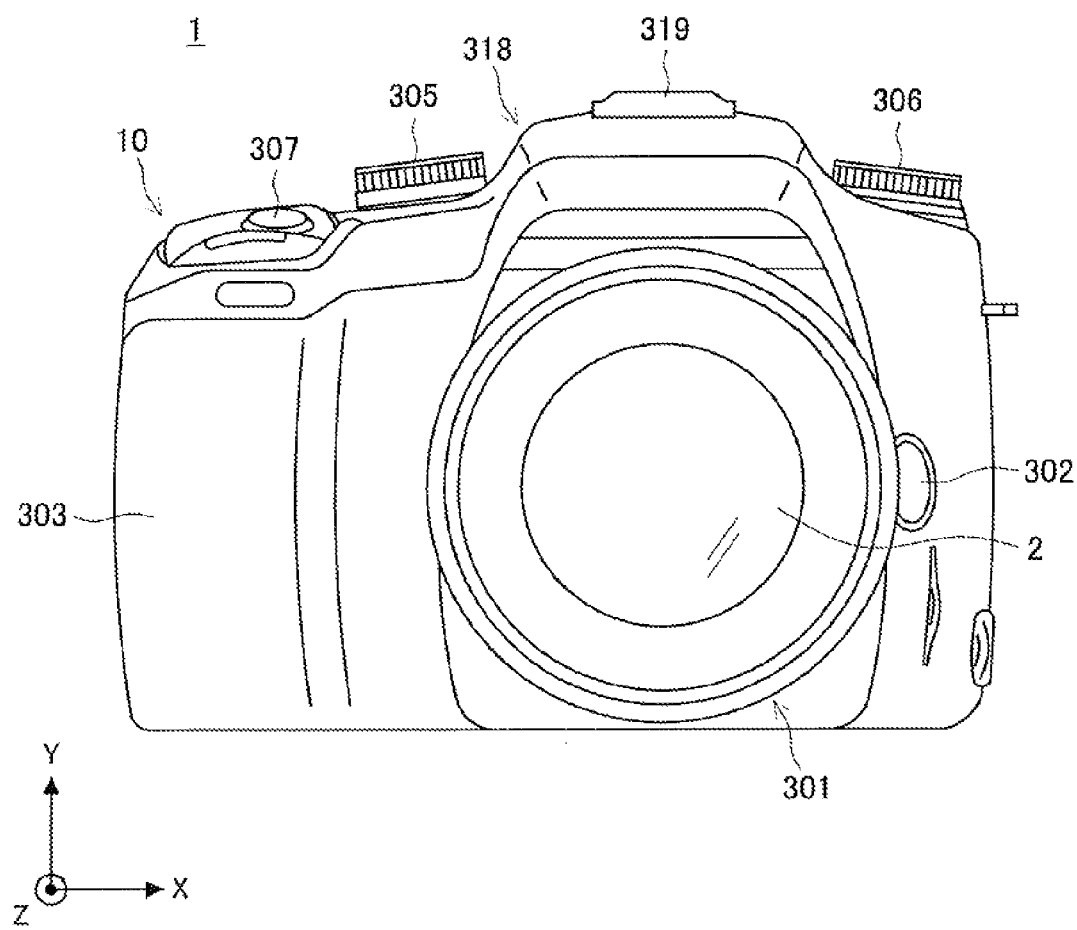
FIG. 15 is a front view showing the outside configuration of the imaging apparatus according to a second embodiment.
Figure 16:
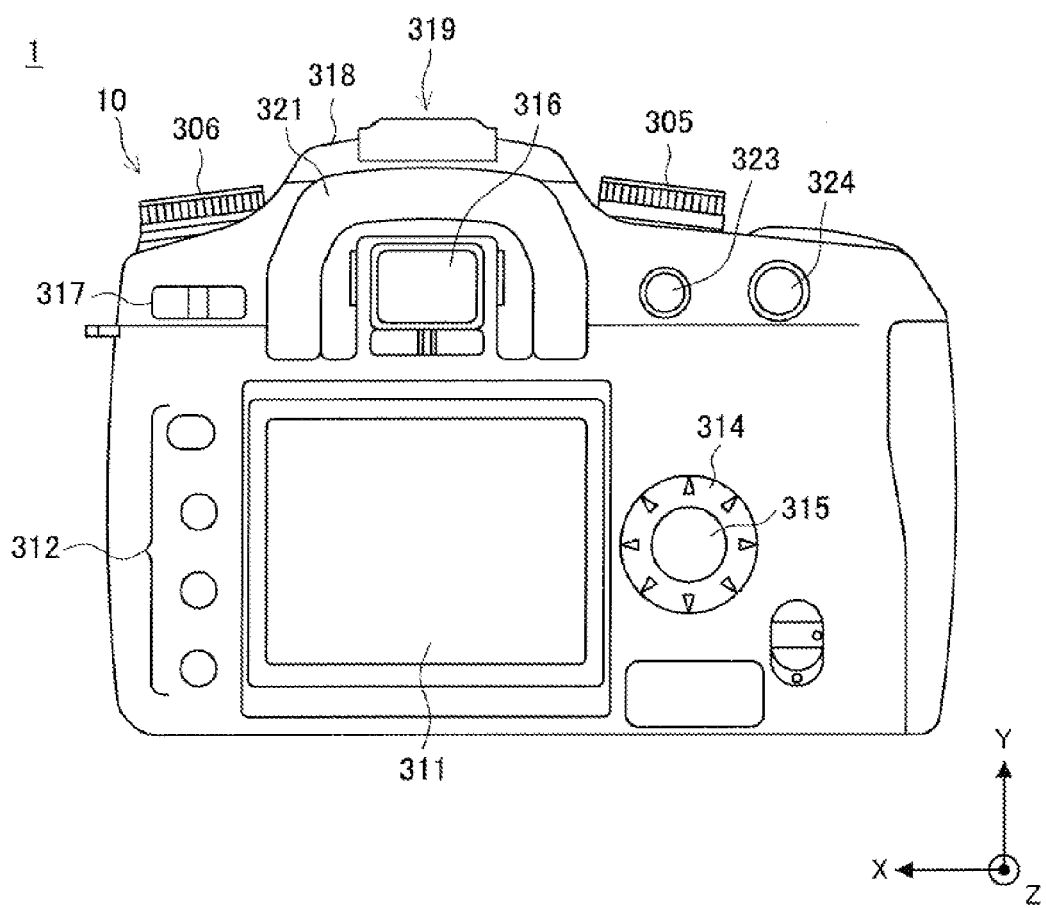
FIG. 16 is a rear view showing the outside configuration of the imaging apparatus according to the second embodiment.

The outside configuration of the imaging apparatus 1 according to the second embodiment will be described with reference to FIGS. 15 and 16. FIG. 15 is a front view showing the outside configuration of the imaging apparatus 1 according to the second embodiment. FIG. 16 is a rear view showing the outside configuration of the imaging apparatus 1 according to the second embodiment. In the description that follows, components with the same reference signs as in the first embodiment have similar function and thus, a detailed description thereof is omitted.

The imaging apparatus 1 is configured as, for example, a single-lens reflex digital still camera. The imaging apparatus 1 includes a camera body 10 and an imaging lens 2 as an interchangeable lens that can freely be attached to and detached from the camera body 10.

As shown in FIG. 15, on the front side of the camera body 10, a mount unit 301 into which the imaging lens 2 is inserted in the substantial center of the front, a lens interchange button 302 arranged on the right side of the mount unit 301, and a grip portion 303 to enable gripping are provided. Also on the front side of the camera body 10, a mode setting dial 305 arranged in a front upper left portion, a control value setting dial 306 arranged in a front upper right portion, and the shutter button 307 arranged on the top surface of the grip portion 303 are provided.

As shown in FIG. 16, on the rear side of the camera body 10, an LCD (Liquid Crystal Display) 311, a setting button group 312 arranged to the left of the LCD 311, a cross key 314 arranged to the right of the LCD 311 are provided. Also on the rear side of the camera body 10, a push button 315 arranged in the center of the cross key 314, an EVF (Electronic View Finder) 316 disposed above the LCD 311, and an eye cup 321 surrounding the EVF 316 are provided. Also on the rear side of the camera body 10, a main switch 317 disposed to the left of the EVF 316 and an exposure correction button 323 and an AE lock button 324 disposed to the right of the EVF 316 are provided. Further, a flash unit 318 and a connection terminal unit 319 disposed above the EVF 316 are provided.

Connectors for electric connection and couplers for mechanical connection to the inserted imaging lens 2 are provided in the mount unit 301. The lens interchange button 302 is a button pressed when the imaging lens 2 inserted into the mount unit 301 should be removed.

The grip portion 303 is a portion of the imaging apparatus 1 gripped when the user captures an image and is provided with surface irregularities fitting to finger shapes to enhance fitting properties. A battery housing and a card housing (not shown) are provided inside the grip portion 303. A battery 69B (see FIG. 18) as a power supply of the camera is housed in the battery housing and a memory card 67 (see FIG. 18) to record image data of captured images are removably housed in the card housing. Incidentally, a grip sensor to detect whether the user grips the grip portion 303 may be provided in the grip portion 303.

The mode setting dial 305 and the control value setting dial 306 are made of a member in a substantial disc shape that can rotate in a plane substantially parallel to the top surface of the camera body 10. The mode setting dial 305 is used to alternatively select the mode or function implemented in the imaging apparatus 1. Modes to be selected include the auto exposure (AE) control mode, the auto focus (AF) control mode, various imaging modes such as the still image mode to capture one still image and the continuous imaging mode to continuously capture images, and the playback mode to play back recorded images. On the other hand, the control value setting dial 306 is used to set control values to various functions implemented in the imaging apparatus 1.

The setting button group 312 includes buttons to operate various functions implemented in the imaging apparatus 1. The setting button group 312 contains a selection determination switch to determine content selected from a menu screen displayed in the LCD 311, a selection cancel switch, a menu display switch to switch content of the menu screen, a display ON/OFF switch, and a display enlarge switch.

The cross key 314 has a ring member including a plurality of pressing portions (triangular marks in FIG. 16) arranged at regular intervals in the circumferential direction and is configured to be able to detect a pressing operation of each pressing portion by a contact (switch) (not shown) included in the pressing portion. The push button 315 is arranged in the center of the cross key 314. The cross key 314 and the push button 315 are used to change the imaging magnification, advance recorded images to be played back in the LCD 311 or the like, and input instructions to set imaging conditions (the F number, shutter speed, firing of a flash and the like).

The EVF 316 includes a liquid crystal panel 310 (see FIG. 17) and displays an image captured by the image sensor 101 (see FIG. 17) or plays back recorded images. With the live view (preview) display in the EVF 316 or LCD 311 that displays an object in dynamic mode based on image signals successively generated by the image sensor 101 before actual imaging (imaging for image recording), the user can visually identify the object actually imaged by the image sensor 101.

The main switch 317 is a 2-contact slide switch that slides to the left and right and the imaging apparatus 1 is turned on when the main switch 317 set to the left and turned off when the main switch 317 set to the right. The flash unit 318 is configured as a popup built-in flash. On the other hand, when an external flash is mounted on the camera body 10, the connection terminal unit 319 is used to connect the external flash.

The eye cup 321 is a shielding member in a "C" shape having light blocking properties to suppress the entry of external light into the EVF 316. The exposure correction button 323 is a button to manually adjust the exposure value (the F number or shutter speed) and the AE lock button 324 is a button to fix the exposure.

The imaging lens 2 functions as a lens window to capture light (light image) from an object and also functions as an imaging optical system to guide light of the object into the image sensor 101 arranged inside the camera body 10. The imaging lens 2 can be removed from the camera body 10 performing a pressing operation of the above lens interchange button 302.

(2-2. Internal Configuration of Imaging Apparatus)

Figure 17:
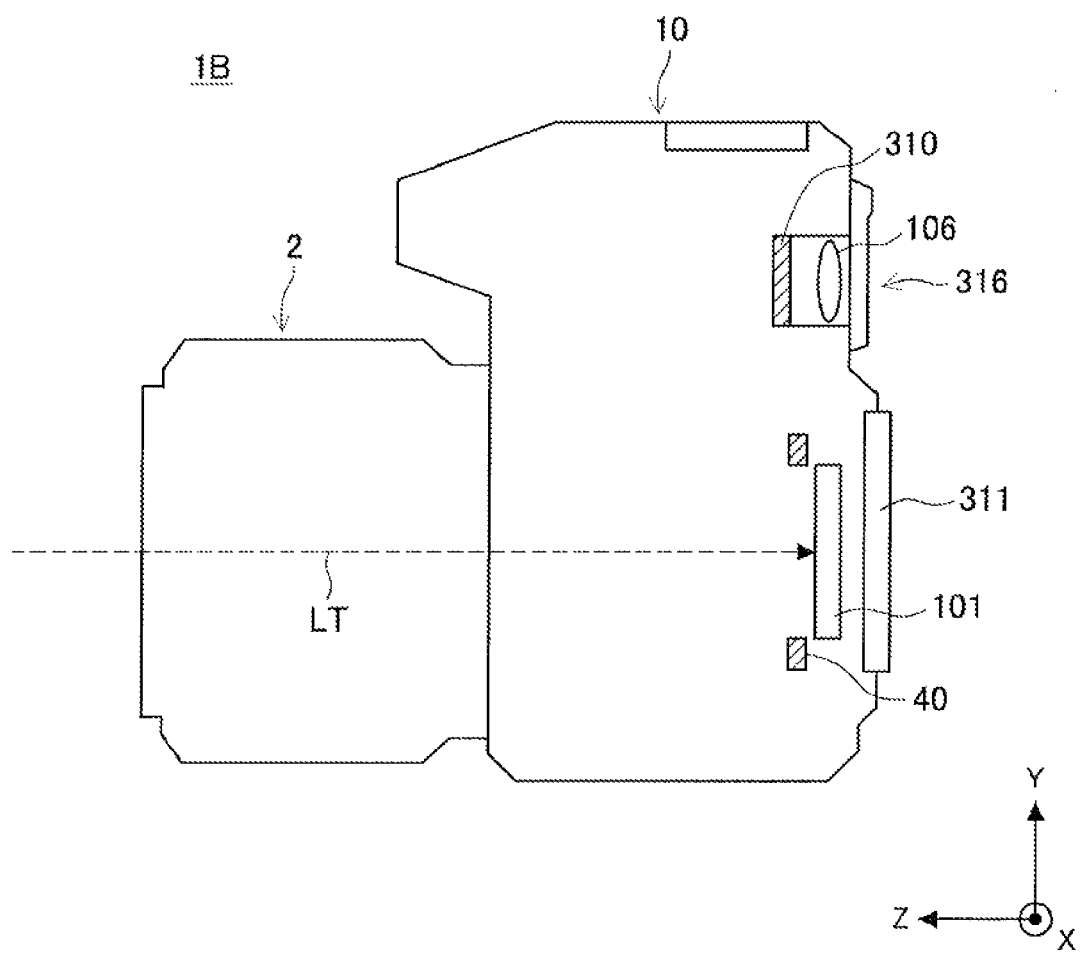
FIG. 17 is a longitudinal view of the imaging apparatus according to the second embodiment.

The internal configuration of the imaging apparatus 1 according to the second embodiment will be described with reference to FIG. 17. FIG. 17 is a longitudinal view of the imaging apparatus 1 according to the second embodiment. As shown in FIG. 17, the image sensor 101, the EVF 316 as an example of a display unit and the like are provided inside the camera body 10.

The image sensor 101 has the same function as the image sensor 4 in the first embodiment and has the normal pixels 110 and the AF pixel pairs 120*f* shown in FIG. 5.

A shutter unit 40 is arranged in front of the image sensor 101 in the optical axis direction. The shutter unit 40 includes a curtain that moves in an up and down direction and is configured as a mechanical focal plane shutter that performs an optical path opening operation and an optical path blocking operation of object light guided to the image sensor 101 along an optical axis LT by its opening operation and closing operation. If the image sensor 101 is an image sensor capable of a complete electronic shutter, the shutter unit 40 may be omitted.

The EVF 316 includes the liquid crystal panel 310 and an eyepiece 106. The liquid crystal panel 310 is configured as, for example, a color liquid crystal panel capable of displaying images and can display images captured by the image sensor 101. The eyepiece 106 guides an object image displayed in the liquid crystal panel 310 to the outside of the EVF 316. With the EVF 316 configured as described above, the user can visually identify the object imaged by the image sensor 101.

(2-3. Electrical Configuration of Imaging Apparatus)

Figure 18:
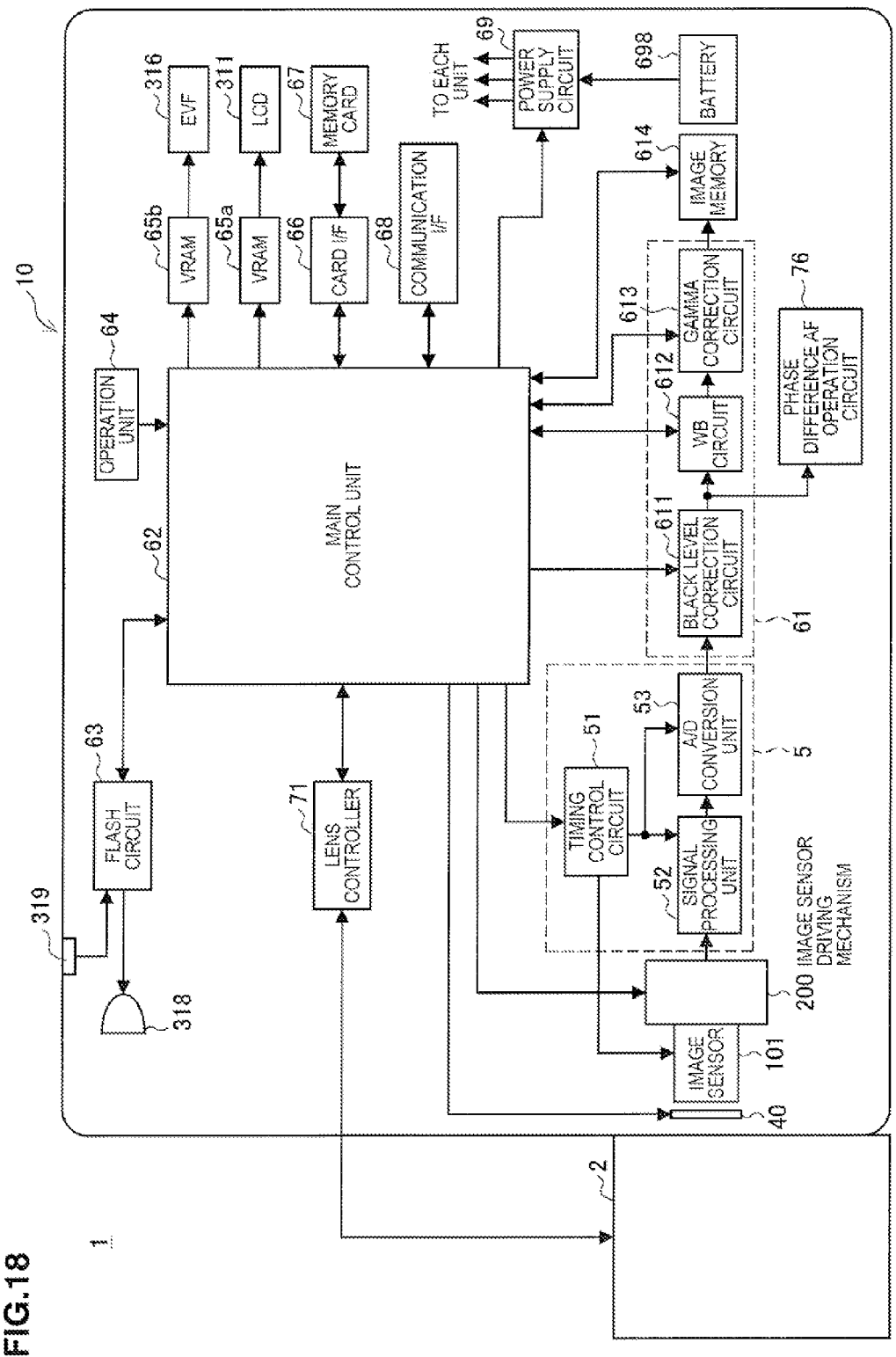
FIG. 18 is a block diagram showing the electrical configuration of the imaging apparatus according to the second embodiment.

The electrical configuration of the imaging apparatus 1 according to the second embodiment will be described with reference to FIG. 18. FIG. 18 is a block diagram showing the electrical configuration of the imaging apparatus 1 according to the second embodiment. The same reference signs are attached to the same members as those in FIGS. 15 to 17.

In addition to the image sensor 101 and the shutter unit 40 described above, an AFE (analog front end) 5, an image processing unit 61, an image memory 614, a main control unit 62, a flash circuit 63, an operation unit 64, VRAM 65 (65*a*, 65*b*), a card interface (I/F) 66, a memory card 67, a communication interface (I/F) 68, a power supply circuit 69, and a battery 69B are provided in the camera body 10.

The image sensor 101 is formed of CMOS color area sensors and imaging operation such as the start (and the end) of an exposure operation of the image sensor 101, the output selection of each pixel included in the image sensor 101, and reading of a pixel signal are controlled by a timing control circuit 51 described later.

The AFE 5 provides a timing pulse for causing a predetermined operation to the image sensor 101. The AFE 5 also performs predetermined signal processing on an image signal (analog signal group received by each pixel of the CMOS area sensor) output from the image sensor 101 to convert the signal into a digital signal and outputs the digital signal to the image processing unit 61. The AFE 5 includes the timing control circuit 51, a signal processing unit 52, and an A/D conversion unit 53.

The timing control circuit 51 generates a predetermined timing pulse (pulse that causes a vertical scanning pulse φVn, horizontal scanning pulse φVm, reset signal φVr or the like) based on a reference clock output from the main control unit 62. The timing control circuit 51 also outputs the generated timing pulse to the image sensor 101 to control the imaging operation of the image sensor 101. The timing control circuit 51 also outputs the predetermined timing pulse to the signal processing unit 52 and the A/D conversion unit 53 to control the operation of the signal processing unit 52 and the A/D conversion unit 53 respectively.

The signal processing unit 52 performs predetermined analog signal processing on an analog image signal output from the image sensor 101. The signal processing unit 52 includes a CDS (correlated double sampling) circuit, an AGC (auto gain control) circuit, a clamp circuit and the like. The A/D conversion unit 53 converts analog R, G, B image signals output from the signal processing unit 52 into a digital image signal formed of a plurality of bits (for example, 12 bits) based on the timing pulse output from the timing control circuit 51.

The image processing unit 61 creates an image file by performing predetermined signal processing on image data output from the AFE 5 and includes a black level correction circuit 611 a white balance control circuit 612, and a gamma correction circuit 613. Image data captured into the image processing unit 61 is temporarily written into the image memory 614 in synchronization with reading of the image sensor 101 and hereafter, the image data written into the image memory 614 is accessed to be processed by each block of the image processing unit 61.

The black level correction circuit 611 corrects the black level of each digital image signal of R, G, B A/D-converted by the A/D conversion unit 53 to the reference black level.

The white balance correction circuit 612 converts the level (white balance (WB) adjustments) of a digital signal of each color component of R (red), G (green), B (blue) based on the reference of white in accordance with the light source. That is, the white balance control circuit 612 identifies a portion in an imaged object assumed to be originally white from luminance, chroma data or the like based on WB adjustment data provided by the main control unit 62. Then, the white balance control circuit 612 determines the average of the color component of each of R, G, B of the identified portion, the G/R ratio, and G/B ratio to make level corrections using the ratios as correction gains of R and B.

The gamma correction circuit 613 corrects gradation characteristics of WB-adjusted image data. More specifically, the gamma correction circuit 613 subjects the level of image data to nonlinear transformation and also offset adjustments by using a preset gamma correction table for each color component.

The image memory 614 is a memory that temporarily stores image data output from the image processing unit 61 in imaging mode and is also used as a work area to perform predetermined processing on the image data by the main control unit 62. In playback mode, the image memory 614 temporarily stores image data read from the memory card 67.

The main control unit 62 is configured as a microcomputer containing a storage unit like, for example, a ROM to store a control program and a RAM to temporarily store data and controls the operation of each unit of the imaging apparatus 1.

The flash circuit 63 controls the light quantity of the flash unit 318 or an external flash connected to the connection terminal unit 319 in flash imaging mode to the light quantity set by the main control unit 62.

The operation unit 64 includes the mode setting dial 305, the control value setting dial 306, the shutter button 307, the setting button group 312, the cross key 314, the push button 315, the main switch 317 described above and is used to input operation information into the main control unit 62.

The VRAM 65*a*, 65*b* have storage capacities of image signals corresponding to the numbers of pixels of the LCD 311 and the EVF 316 and are buffer memories between the main control unit 62, and the LCD 311 and the EVF 316. The card I/F 66 is an interface that enables transmission/reception of signals between the memory card 67 and the main control unit 62. The memory card 67 is a recording medium to store image data generated by the main control unit 62. The communication I/F 68 is an interface that enables transmission of image data and the like to personal computers and other external devices.

The power supply circuit 69 is configured by, for example, a constant voltage circuit and generates voltages to drive the whole imaging apparatus 1 such as the control unit like the main control unit 62, the image sensor 101, and other various driving units. Incidentally, energization control of the image sensor 101 is performed by a control signal provided from the main control unit 62 to the power supply circuit 69. The battery 69B is configured as a secondary battery such as a nickel hydrogen battery or a primary battery such as an alkaline battery and is a power supply that supplies power to the whole imaging apparatus 1.

The camera body 10 also includes a phase difference AF operation circuit 77 that performs an operation needed for auto focus (AF) control using the image sensor 101 based on black level corrected image data output from the black level correction circuit 611.

(2-4. Object Tracking Function)

Also the imaging apparatus 1 according to the second embodiment has an object tracking function similar to the one in the first embodiment. That is, the imaging apparatus 1 according to the second embodiment acquires distance information to an object imaged by the image sensor 101, acquires pixel value information about the object, and tracks the moving object based on the acquired distance information and pixel value information.

Accordingly, even if, for example, a plurality of objects has the same pixel value information of the color, luminance or the like, individual objects can be recognized based on the distance information and the desired object can be tracked and therefore, the moving object can be tracked with high precision.

3. Third Embodiment

When compared with the second embodiment, the imaging apparatus 1 according to the third embodiment has a similar outside configuration, but the internal configuration is different. Thus, mainly portions different from those in the second embodiment will be described below.

Figure 19:
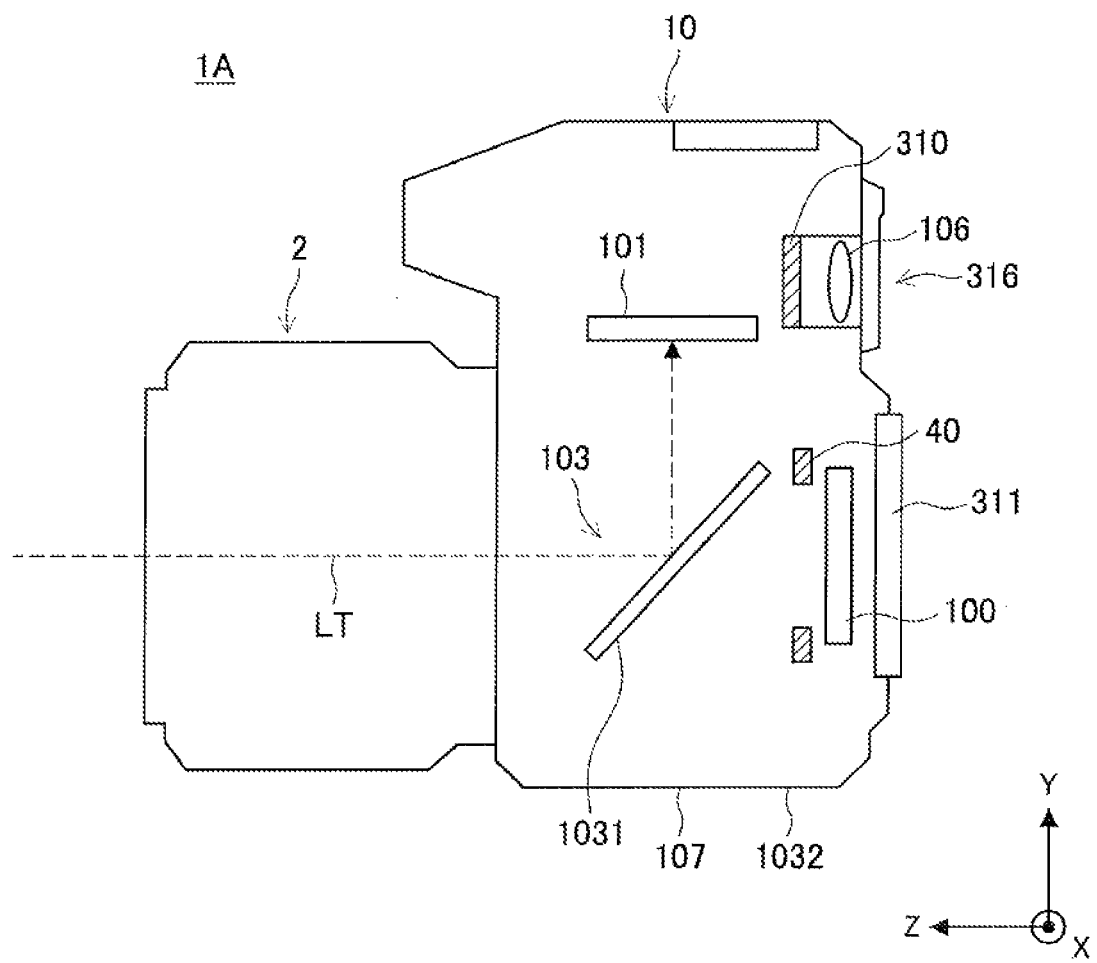
FIG. 19 is a longitudinal view of the imaging apparatus according to a third embodiment.
Figure 20:
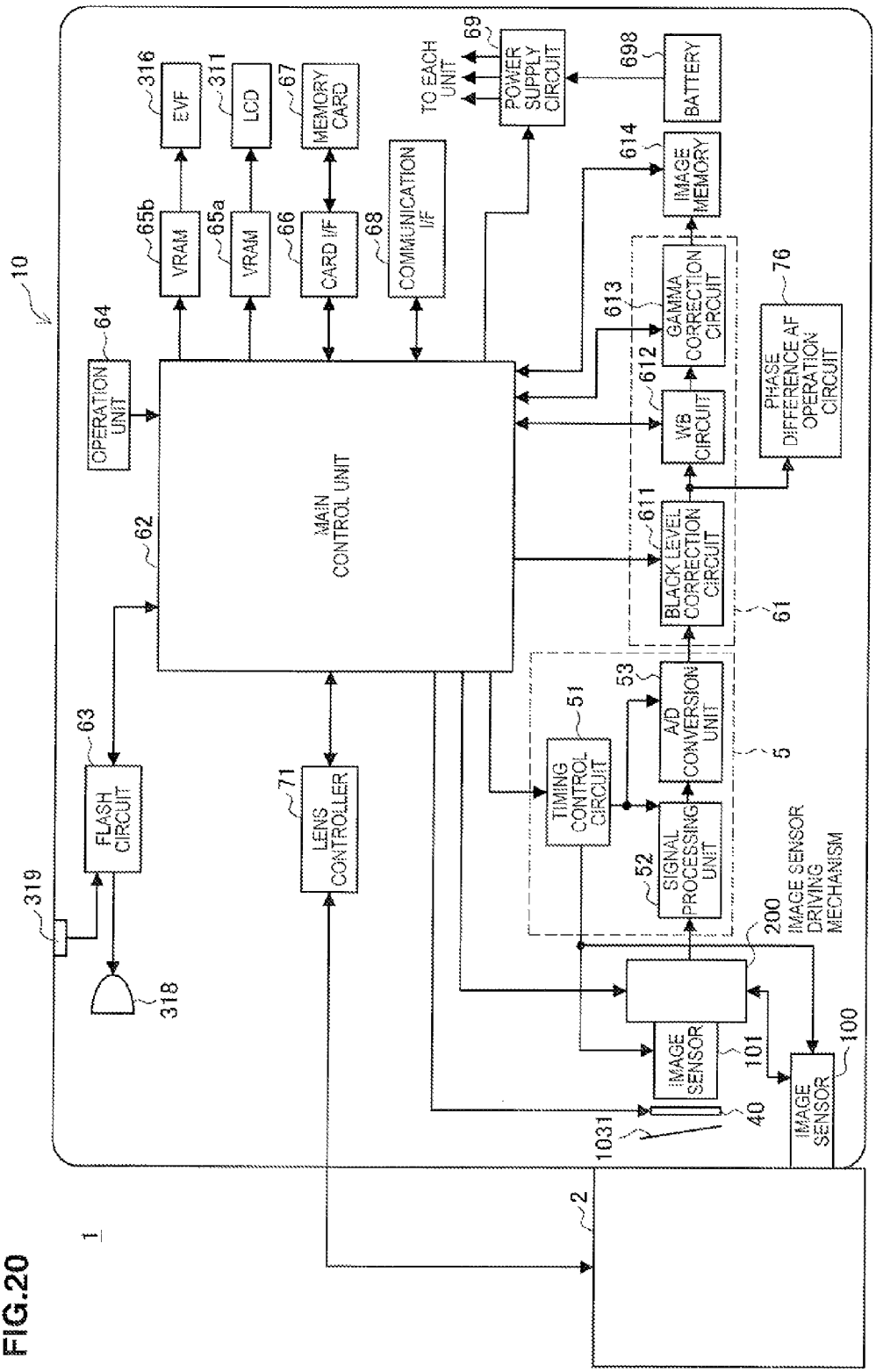
FIG. 20 is a block diagram showing the electrical configuration of the imaging apparatus according to the third embodiment.

FIG. 19 is a longitudinal view of the imaging apparatus a according to the third embodiment. FIG. 20 is a block diagram showing the electrical configuration of the imaging apparatus 1 according to the third embodiment.

As shown in FIG. 19, two image sensors 100, 101, a mirror unit 1031 and the like are provided inside the camera body 10. The image sensor 100 of the two image sensor is used to capture a still image (actual imaging) and the image sensor 101 has phase difference pixels for imaging of through images and phase difference detection. The image sensor 101 corresponds to a first image sensor having phase difference pixels and the image sensor 100 corresponds to a second image sensor to generate live view display images.

The transmission mirror unit 1031 is configured as a transmission/reflection member that reflects and transmits object light toward the image sensor 101 provided in an upper part of the camera body 10 and the image sensor 100 on the optical axis LT and is installed securely in the camera body 10. The ratio of transmission and reflection is set to 5:5, but can arbitrarily be changed in accordance with characteristics of each image sensor.

The object light having passed through the imaging lens 2 is reflected upward by the transmission mirror unit 1031 and also a portion of the object light having passed through the imaging lens 2 passes through the transmission mirror unit 1031 to enter the image sensor 100. In addition, a portion of the object light is reflected by the transmission mirror unit 1031 and the reflected object light enters the image sensor 101.

The image sensor 100 is arranged on a plane (XY plane) parallel to the Y axis and receives the object light having passed through the transmission mirror unit 1031. The image sensor 101 is arranged on a plane (XZ plane) perpendicular to the Y axis and receives object light. The image sensor 101 has a function similar to that of the image sensor 101 in the second embodiment and has the normal pixels 110 and the AF pixel pairs 120f shown in FIG. 5. On the other hand, the image sensor 100 has the normal pixels 110, but does not have the AF pixel pairs 120f.

The shutter unit 40 is arranged, as shown in FIG. 20, toward the front of the image sensor 100. The shutter unit 40 is configured as a mechanical focal plane shutter that performs an optical path opening operation and an optical path blocking operation of object light toward the image sensor 100. If the image sensor 100 is an image sensor capable of a complete electronic shutter, the shutter unit 40 may be omitted.

The AFE 5 provides a timing pulse for causing a predetermined operation to the image sensors 100, 101 and also performs predetermined signal processing on an image signal (analog signal group received by each pixel of the CMOS area sensor) output from the image sensors 100, 101 to convert the signal into a digital signal and outputs the digital signal to the image processing unit 61. The AFE 5 is configured by including the timing control circuit 51, the signal processing unit 52, and the A/D conversion unit 53.

The timing control circuit 51 generates a predetermined timing pulse (pulse that causes a vertical scanning pulse φVn, horizontal scanning pulse φVm, reset signal φVr or the like) based on a reference clock output from the main control unit 62 and outputs the generated timing pulse to the image sensors 100, 101 to control the imaging operation of the image sensors 100, 101. The timing control circuit 51 also outputs the predetermined timing pulse to the signal processing unit 52 and the A/D conversion unit 53 to control the operation of the signal processing unit 52 and the A/D conversion unit 53 respectively.

The signal processing unit 52 performs predetermined analog signal processing on an analog image signal output from the image sensor 101. The signal processing unit 52 includes a CDS (correlated double sampling) circuit, an AGC (auto gain control) circuit, a clamp circuit and the like. The A/D conversion unit 53 converts analog R, G, B image signals and a phase difference pixel signal output from the signal processing unit 52 into a digital image signal formed of a plurality of bits (for example, 12 bits) based on the timing pulse output from the timing control circuit 51.

Also the third embodiment has an object tracking function similar to the one in the first and second embodiments. Accordingly, even if the object is deformed or accompanied by a complex movement, an image in focus can be captured while the object being tracked on full screen with high precision. Further, even if the object is positioned near the imaging apparatus 1, focusing can be detected at high speed by high-speed driving of the image sensors.

Also in the third embodiment, the image sensor 100 images an object during live view display of object images by the EVF 316. By providing the image sensor 100 that captures through images intended for the live view display and the image sensor 101 that captures still images independently in this manner, a through image can be displayed together when a still image is captured.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

An image processing apparatus is supposed to be an image capturing apparatus in the above embodiments, but is not limited to this. The image processing apparatus only has to have a function for capturing images of the subject, and may be a mobile phone, a smart phone, a PDA (Personal Digital Assistant), a portable AV player, an electronic book, an electronic dictionary or the like, for example.

Further, while the steps shown in the flow charts of the above described embodiments may of course be processed in chronological order in accordance with the described order, they may not necessarily be processed in chronological order, and may be processed individually or in a parallel manner. It is needless to say that, in the case where the steps are processed in chronological order, the order of the steps may be changed appropriately according to the circumstances.

The processes by the image processing apparatus described in the present disclosure may be implemented by using any of the combinations of software, hardware, or software and hardware. Programs constituting the software are stored, for example, in advance in a storage medium installed inside or outside of each apparatus. Also, each program is read, for example, to a RAM (Random Access Memory) when executed, and is executed by a processor such as a CPU.

Additionally, the present technology may also be configured as below.

(1)

An image processing apparatus including:

a distance information acquisition unit that acquires distance information on a distance up to an object imaged by an image sensor;

a pixel value information acquisition unit that acquires pixel value information of an image corresponding to the object; and a tracking unit that tracks the object that moves, based on the acquired distance information and the acquired pixel value information.

(2)

The image processing apparatus according to (1), wherein the image sensor includes a phase difference pixel for detecting a phase difference of the object and adjusting focus, and wherein the distance information acquisition unit acquires the distance information based on the phase difference detected by the phase difference pixel.

(3)

The image processing apparatus according to (2), wherein the image sensor includes a plurality of the phase difference pixels, and wherein the distance information acquisition unit acquires the distance information by thinning out a portion of the plurality of phase difference pixels in accordance with a size of the object.

(4)

The image processing apparatus according to any one of (1) to (3), further including:

an object identification unit that identifies the object to be tracked, based on the acquired distance information, wherein the tracking unit tracks the object identified by the object identification unit.

(5)

The image processing apparatus according to any one of (1) to (4), further including:

a display unit that performs live view display for the image corresponding to the object, wherein the image sensor images the object when the display unit performs live view display for the image.

(6)

The image processing apparatus according to (5), wherein the image sensor is a first image sensor including a phase difference pixel for detecting a phase difference of the object and adjusting focus, and wherein the image processing apparatus further includes a second image sensor that is used for generation of an image for which the display unit to perform live view display.

(7)

The image processing apparatus according to any one of (1) to (6), wherein the distance information acquisition unit acquires pieces of the distance information of the object positioned in different locations, and wherein the image processing apparatus further includes a prediction unit that predicts the distance information of the object in a location that is a destination, based on the acquired pieces of the distance information.

(8)

The image processing apparatus according to any one of (1) to (7), wherein the tracking unit tracks the object when the pixel value information of the object in a location that is a destination is identical to the pixel value information of the object in the last location.

(9)

An image processing method including:

acquiring distance information on a distance up to an object imaged by an image sensor;

acquiring pixel value information of an image corresponding to the object; and tracking the object that moves, based on the acquired distance information and the acquired pixel value information.

(10)

A recording medium having a program recorded thereon, the program causing a computer to execute:

acquiring distance information on a distance up to an object imaged by an image sensor;

acquiring pixel value information of an image corresponding to the object; and tracking the object that moves, based on the distance information and the pixel value information acquired.

REFERENCE SIGNS LIST

1 imaging apparatus
4, 100, 101 image sensor
110 normal pixel 120f AF pixel pair
210 distance information acquisition unit
220 pixel value information acquisition unit
230 object identification unit
240 prediction unit
250 tracking unit

The invention claimed is:

1. An image processing apparatus, comprising:
one or more processors configured to:
select one of an auto imaging mode or a program imaging mode based on a user input,
wherein the auto imaging mode includes a plurality of Auto Focus (AF) regions containing a first number of AF points, and
wherein the first number of AF points correspond to a range in which an object to be imaged lies;
acquire pieces of distance information of the object positioned at a plurality of locations, wherein the distance information represents a second number of AF points that are identified as the object imaged by an image sensor;
acquire pixel value information of a first image corresponding to the object;
predict the distance information of the object in a destination location based on the pieces of the distance information
wherein the pieces of the distance information are acquired by thinning out a plurality of AF pixels corresponding to the first image based on the second number of AF points that are greater than half of the first number of AF points; and
track the object, based on the predicted distance information and the acquired pixel value information.

2. The image processing apparatus according to claim 1, wherein the image sensor that includes a plurality of AF pixels is configured to detect a phase difference of the object and adjust focus, and
wherein the pieces of the distance information are acquired based on the phase difference detected by the plurality of AF pixels.

3. The image processing apparatus according to claim 1, further comprising:
a display unit configured to display a live view of the first image corresponding to the object,
wherein the image sensor is configured to image the object based on the display unit that displays the live view of the first image.

4. The image processing apparatus according to claim 3, wherein the image sensor is a first image sensor including an AF pixel configured to detect a phase difference of the object and adjust focus, and
wherein the image processing apparatus further includes a second image sensor configured to generate a second image for which the display unit is configured to display the live view.

5. The image processing apparatus according to claim 1, wherein the one or more processors are further configured to track the object based on the pixel value information of the object in the destination location that is identical to the pixel value information of the object at the plurality of locations.

6. An image processing method, comprising:
selecting one of an auto imaging mode or a program imaging mode based on a user input,
wherein the auto imaging mode includes a plurality of Auto Focus (AF) regions containing a first number of AF points, and
wherein the first number of AF points correspond to a range in which an object to be imaged lies;
acquiring pieces of distance information of the object positioned at a plurality of locations, wherein the distance information represents a second number of AF points that are identified as imaged by an image sensor;
acquiring pixel value information of an image corresponding to the object;
predicting the distance information of the object in a destination location based on the pieces of the distance information,
wherein the pieces of the distance information are acquired by thinning out a plurality of AF pixels corresponding to the image based on the second number of AF points that are greater than half of the first number of AF points; and
tracking the object that moves, based on the predicted distance information and the acquired pixel value information.

7. A non-transitory computer-readable medium having stored thereon, computer-executable instructions, which when executed by computer, cause the computer to execute operations, the operations comprising:
selecting one of an auto imaging mode or a program imaging mode based on a user input,
wherein the auto imaging mode includes a plurality of Auto Focus (AF) regions containing a first number of AF points, and
wherein the first number of AF points correspond to a range in which an object to be imaged lies;
acquiring pieces of distance information of the object positioned at a plurality of locations, wherein the distance information represents a second number of AF points that are identified as the object imaged by an image sensor;
acquiring pixel value information of an image corresponding to the object;
predicting the distance information of the object in a destination location based on the pieces of the distance information,
wherein the pieces of the distance information are acquired by thinning out a plurality of AF pixels corresponding to the image based on the second number of AF points that are greater than half of the first number of AF points; and
tracking the object that moves, based on the predicted distance information and the acquired pixel value information.

8. The image processing apparatus according to claim 1, wherein the one or more processors are further configured to:
determine, based on the distance information, that the object is in the range from the image sensor to track the object; and
track the object, based on the distance information that is in the range, wherein the range is based on a shape of the object.

* * * * *